United States Patent
Kato et al.

(10) Patent No.: US 9,646,215 B2
(45) Date of Patent: May 9, 2017

(54) EYE PART DETECTION APPARATUS

(71) Applicant: AISIN SEIKI KABUSHIKI KAISHA, Kariya-shi, Aichi-ken (JP)

(72) Inventors: Takashi Kato, Anjo (JP); Shin-ichi Kojima, Nagakute (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 303 days.

(21) Appl. No.: 14/509,579

(22) Filed: Oct. 8, 2014

(65) Prior Publication Data
US 2015/0098654 A1    Apr. 9, 2015

(30) Foreign Application Priority Data

Oct. 9, 2013    (JP) .................................. 2013-211623

(51) Int. Cl.
*G06K 9/00*    (2006.01)
*G06T 7/00*    (2017.01)
*G06T 7/62*    (2017.01)

(52) U.S. Cl.
CPC ....... *G06K 9/00845* (2013.01); *G06K 9/0061* (2013.01); *G06K 9/00617* (2013.01); *G06T 7/62* (2017.01); *G06T 7/97* (2017.01); *G06T 2207/10016* (2013.01); *G06T 2207/30201* (2013.01)

(58) Field of Classification Search
USPC .................................................. 382/190, 118
See application file for complete search history.

(56) References Cited

U.S. PATENT DOCUMENTS

| | | | | |
|---|---|---|---|---|
| 5,870,138 A | * | 2/1999 | Smith | ............... G06K 9/00228 348/143 |
| 8,564,667 B2 | * | 10/2013 | Yun | ...................... G01S 3/7865 348/143 |
| 8,836,777 B2 | * | 9/2014 | Mehra | ..................... G06F 3/013 345/7 |

(Continued)

FOREIGN PATENT DOCUMENTS

| | | |
|---|---|---|
| EP | 1973059 A2 | 9/2008 |
| JP | 2000-040148 A | 2/2000 |
| JP | 2000105829 A | 4/2000 |
| JP | 2008-192100 A | 8/2008 |

OTHER PUBLICATIONS

Communication dated May 8, 2015, issued by the European Patent Office in counterpart Application No. 14187262.2.

(Continued)

*Primary Examiner* — Ishrat I Sherali
(74) *Attorney, Agent, or Firm* — Sughrue Mion, PLLC

(57) ABSTRACT

An eye part detection apparatus includes: a unit configured to input an image of a face captured for each specific time; a unit configured to extract an eye search region on the basis of feature points including a nose from the image; a unit configured to correlate the eye search region at a first time with the eye search region at a second time on the basis of comparison between positions of the feature points at the first time and positions of the feature points at the second time; and a unit configured to determine eye part regions from the eye search regions at the first and second times on the basis of the correlated eye search regions at the first and second times.

9 Claims, 15 Drawing Sheets

(56) References Cited

U.S. PATENT DOCUMENTS

2008/0212850 A1    9/2008   Adachi et al.
2008/0232650 A1    9/2008   Suzuki et al.

OTHER PUBLICATIONS

Sidibe et al., Robust Facial Features Tracking Using Geometric Constraints and Relaxation, Multimedia Signal Processing, 2009. MMSP '09. IEEE International Workshop on, IEEE, Piscataway, NJ, USA,Oct. 5, 2009 , pp. 1-6.
Michael Chau et al: "Real Time Eye Tracking and Blink Detection with USB Cameras",Boston University Computer Computer Science Technical Report No. 2005-12, May 12, 2005, pp. 1-10.
Dimitry Gorodnichy: "Second Order Change Detection, and its Application to Blink-Controlled Perceptual Interfaces", Proceedings of the International Association of Science and Technology for Development (IASTED) Conference on Visualization, Imaging and Image Processing (VHP 2003), Sep. 8, 2003 , pp. 140-145.
Collet C et al: "CapRe: a gaze tracking system in man-machine interaction", Intelligent Engineering Systems, 1997. INES '97. Proceedings., 1997 IE EE International Conference on Budapest,Hungary Sep. 15-17, 1997, New York, NY, USA,IEEE, US, Sep. 15, 1997, pp. 577-581.
Yano K et al: "Detection of eye blinking from video camera with dynamic ROI fixation",A Systems, Man, and Cybernetics, 1999. IEEE SMC '99 Conference Proceedin gs. 1999 IEEE International Conference on Tokyo, JapanOct. 12-15, 1999, Piscataway, NJ, USA,IEEE,US, vol. 6, Oct. 12, 1999, pp. 335-339, XP010363163.

* cited by examiner

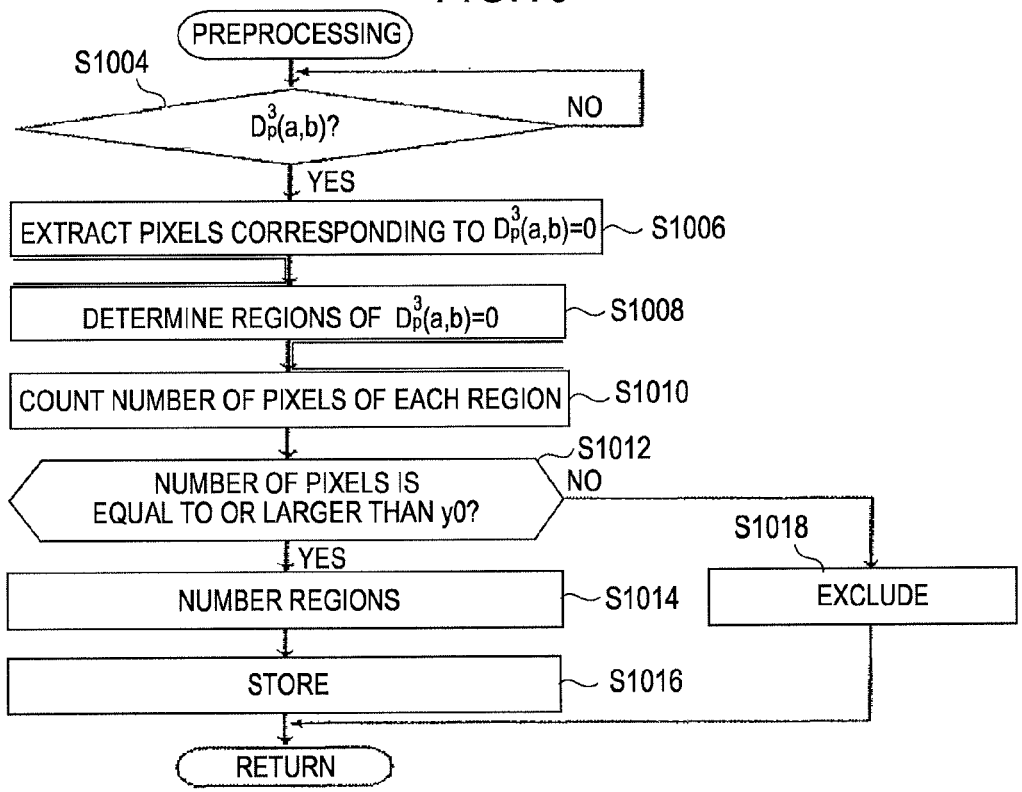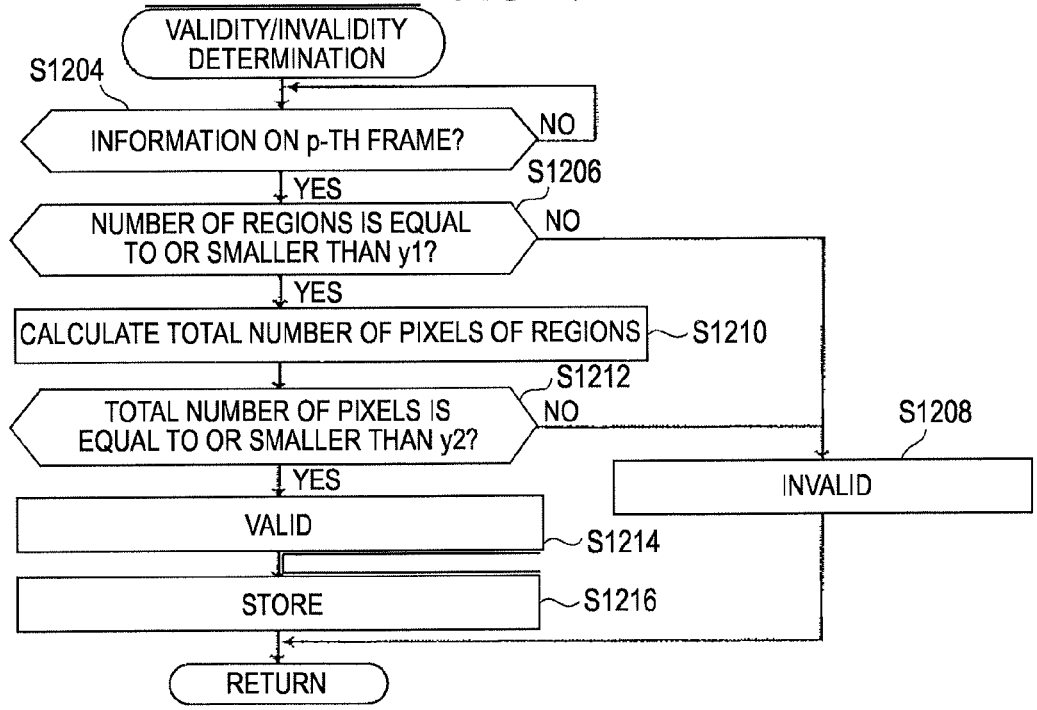

EYE PART DETECTION APPARATUS

CROSS REFERENCE TO RELATED APPLICATIONS

This application is based on and claims priority under 35 U.S.C. §119 to Japanese Patent Application 2013-211623, filed on Oct. 9, 2013, the entire contents of which are incorporated herein by reference.

TECHNICAL FIELD

This disclosure relates to an eye part detection apparatus of an operator of a vehicle or the like.

BACKGROUND DISCUSSION

In recent years, development of a facial recognition technique for recognizing a face from a captured still image or moving image has progressed. In a vehicle, an apparatus has been devised in which inattentive driving or dozing off while driving is detected by detecting blinking operation of an operator, and warning is given to the operator.

For example, an apparatus disclosed in JP 2000-040148A (Reference 1) sequentially captures images including a left eye region (window) of a driver, determines regions in which a luminance difference between the images exceeds a predetermined value through comparison between the latest image and the previous image, and calculates an area difference between a region whose luminance increases and a region whose luminance decreases. The time series data is compared with a predetermined blinking pattern so that a blinking operation of the driver is extracted, and thus treatment for preventing dozing while driving is performed. In other words, this apparatus detects the blinking operation with a region of a single eye as a reference. Therefore, if the face moves, a position and a shape of the eye changes, and thus the region used as a reference of detection also changes. For this reason, it is difficult to accurately identify the region used as a reference for detection, and thus errors in detection of a blinking operation frequently occur.

In addition, an eyelid detection apparatus disclosed in US 2008/0212850 (Reference 2) extracts a region in which an area of a region (difference region) where a difference between captured images exceeds a predetermined value is at maximum, detects an eyelid in the difference region, and further detects a blinking operation from a variation in the eyelid. This apparatus extracts a rectangular region which is in contact with a driver's face from the image, and identifies a difference region between a plurality of images of the region so as to detect a blinking operation. In other words, a region which is compared in order to detect a blinking operation is set with a contour of a face as a reference.

Here, in a case where the driver confirms directions of the vehicle with rearview mirrors, an angle of the face varies in a yaw direction or the like with respect to a vehicle traveling direction. For this reason, the shape and size of the rectangular region which is a detection target of a blinking operation vary, and thus difference regions also occur in the nose, eyebrows, face perimeter, and the like which are regions other than the eyes. If a difference region in which an area variation is the maximum is a region other than the eyes, the region other than the eyes, for example, the face perimeters, the eyebrows, or the like are wrongly detected as the eyes. In other words, in the apparatus disclosed in Reference 2, since a region for detecting the eyelids is set with a contour of the face as a reference, detection errors tend to occur if the contour of the face significantly changes.

As mentioned above, in the apparatuses of the related art, in a case where a driver's face moves, detection errors occur.

As described above, in the apparatus disclosed in Reference 1, since a blinking operation is detected on the basis of a region of only one eye, the region for detection varies due to the movement of the entire face, and thus errors in detection of a blinking operation tend to occur. In addition, in the apparatus disclosed in Reference 2, since the region for detecting the eyelids is set with the contour of the face as a reference, similarly, detection errors tend to occur due to the movement of the entire face.

SUMMARY

Thus, a need exists for an eye part detection apparatus which is not suspectable to the drawback mentioned above.

According to an aspect of this disclosure, there is provided an eye part detection apparatus including a unit configured to input an image of a face captured at each specific time; a unit configured to extract an eye search region on the basis of feature points including a nose from the image; a unit configured to correlate the eye search region at a first time with the eye search region at a second time on the basis of comparison between positions of the feature points at the first time and positions of the feature points at the second time; and a unit configured to determine eye part regions from the eye search regions at the first and second times on the basis of the correlated eye search regions at the first and second times.

According to the aspect of this disclosure, the eye search region is set on the basis of feature points including a nose, and the eye search region at the first time is correlated with the eye search region at the second time on the basis of comparison between positions of the feature points at the first time and positions of the feature points at the second time. The eye part regions are determined from the eye search regions at the first and second times on the basis of the correlated eye search regions at the first and second times. Even in a case where a direction of the face changes, a shape change of the nose is relatively small. Since the nose is located around the center of the face, even in a case where the face rotates, the variation in the relative position between the nose and the eye parts is small.

The eye search region is set with the nose as a reference, and thus an eye part position can be accurately detected even in a case where the shape of the face changes.

BRIEF DESCRIPTION OF THE DRAWINGS

The foregoing and additional features and characteristics of this disclosure will become more apparent from the following detailed description considered with the reference to the accompanying drawings, wherein:

FIGS. 6A and 6B illustrate an example of a luminance variation in images captured by the imaging section according to the embodiment disclosed here, in which FIG. 6A illustrates an eye search region right after a vehicle passes through an exit of a tunnel, and FIG. 6B illustrates an eye search region right after the vehicle enters the tunnel from an entrance of the tunnel;

FIGS. 11A and 11B illustrate an example of noise in the ternarized image according to the embodiment disclosed here, in which FIG. 11A illustrates an eye search region when a driver wears glasses, and FIG. 11B illustrates a ternarized image of FIG. 11A;

FIG. 18 is a flowchart illustrating details of preprocessing of eye part region determination according to the embodiment disclosed here;

FIG. 19 is a flowchart specifically illustrating details of a scene validity/invalidity determination process according to the embodiment disclosed here.

DETAILED DESCRIPTION

Hereinafter, with reference to the drawings, an eye part detection apparatus according to an embodiment disclosed here will be described.

Figure 1:
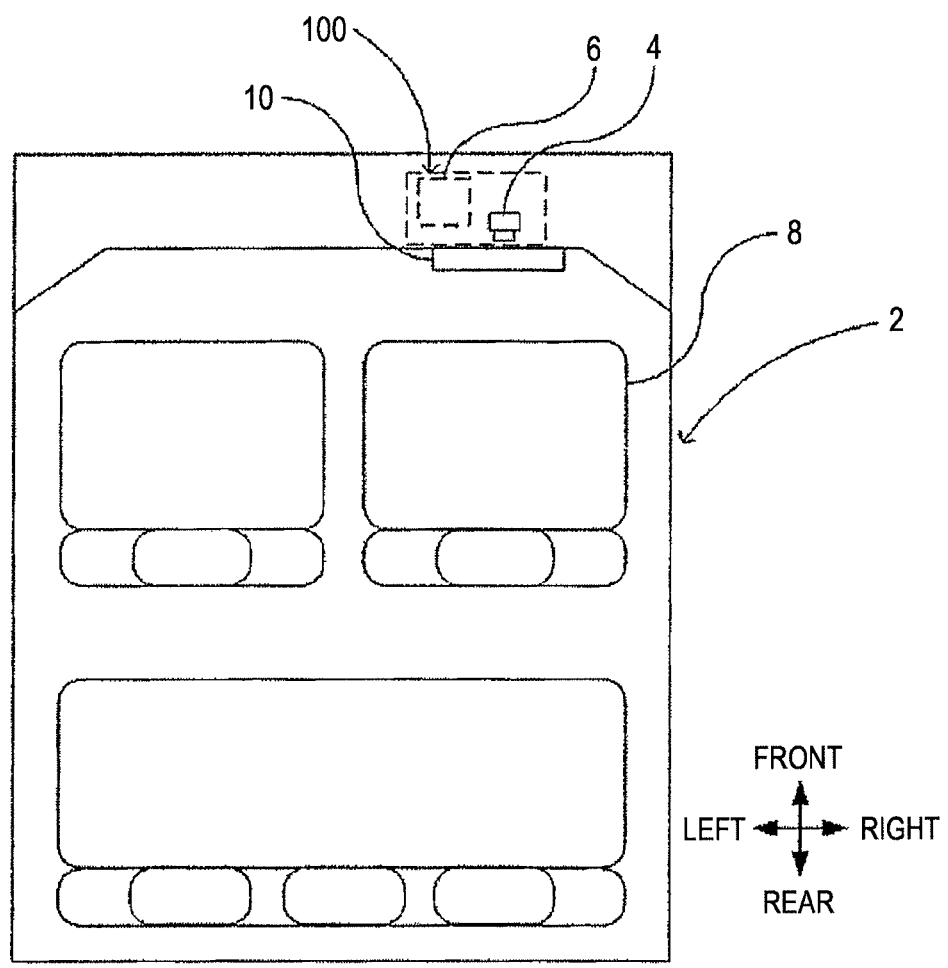
FIG. 1 is a diagram illustrating that an eye part detection apparatus according to an embodiment disclosed here is mounted in a vehicle.

FIG. 1 is a diagram illustrating that an eye part detection apparatus 100 according to the embodiment disclosed here is mounted in a vehicle. As one example, the eye part detection apparatus 100 is mounted in a vehicle 2 and includes an imaging section 4 and a data processing section 6. The imaging section 4 is installed so as to capture, from the front side, an image of the face of a driver who operates the vehicle 2, around a driver's seat 8 of the vehicle 2, especially, around a steering wheel 10. In the case of FIG. 1, the driver's seat 8 is set on the right side of the vehicle, and thus the imaging section 4 is installed in front of the right seat in a front part of the vehicle. In the case that the driver's seat 8 is located on the left side, the imaging section 4 is installed in front of the left seat in the front part of the vehicle. The imaging section 4 captures an image of the face for each predetermined time, and transmits the captured image to the data processing section 6. The data processing section 6 detects an eye part of the driver from the captured image, and determines a blinking operation of the driver through comparison between the eyes for each predetermined time.

Figure 2:
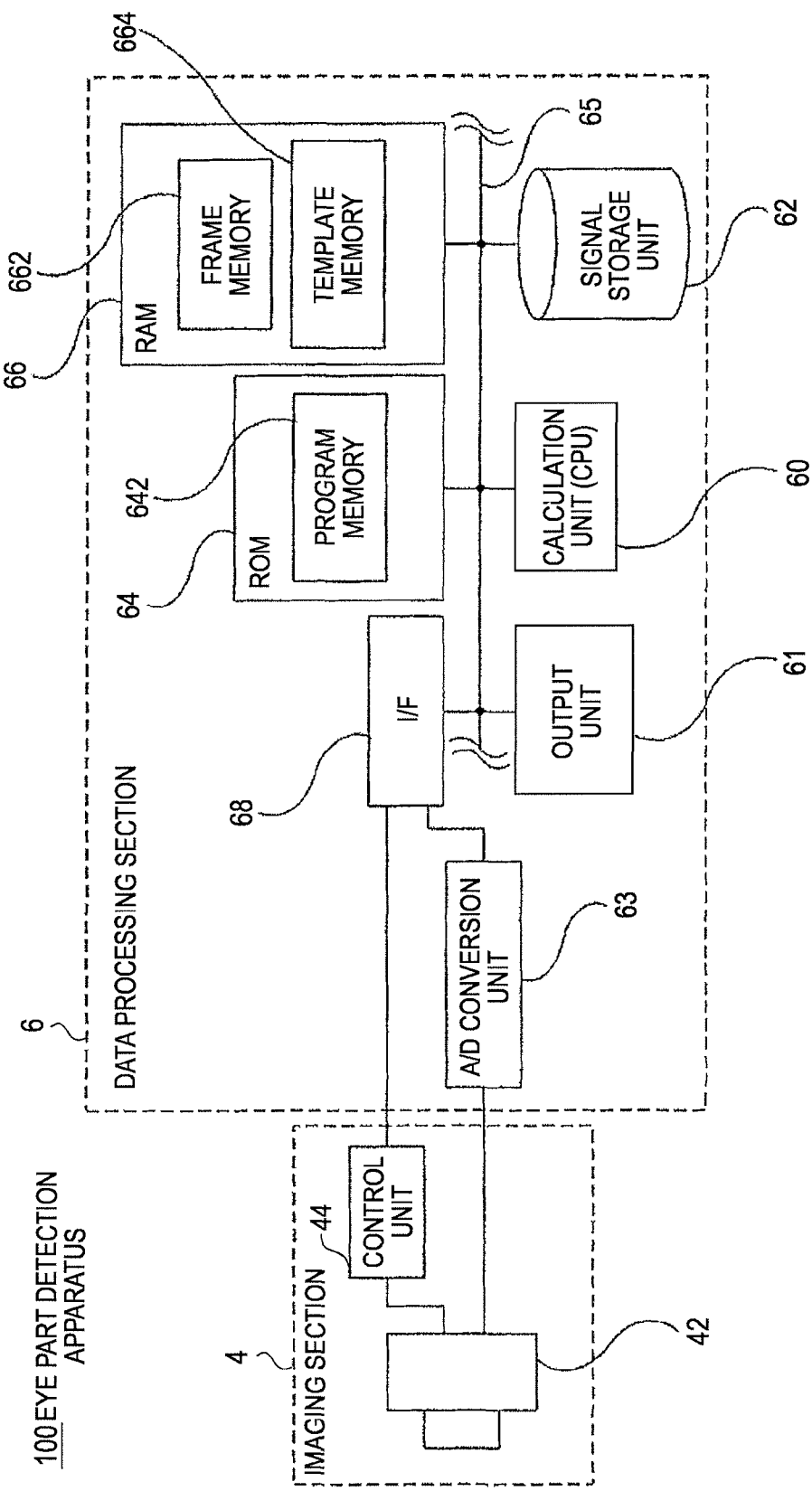
FIG. 2 is a schematic block diagram of the eye part detection apparatus according to the embodiment disclosed here.

FIG. 2 is a schematic block diagram of the eye part detection apparatus 100 according to the embodiment disclosed here. The imaging section 4 includes a camera 42 and a control unit 44. The camera 42 may be a typical visible light CCD camera or CMOS camera, and may be a near infrared CCD camera. The near infrared CCD camera does not depend on individual human skin colors in comparison with the visible light CCD camera. In addition, the shutter speed of the near infrared CCD camera can be made higher than the shutter speed of the visible light CCD camera.

The control unit 44 controls the camera 42. The control unit 44 performs control for opening and closing a shutter of the camera 42 at each predetermined time or in response to a signal from the data processing section 6. A captured image signal is recorded as a frame in a frame memory 662 of a RAM 66. In other words, an image captured at a certain point in time is referred to as a frame.

The data processing section 6 detects an eye part region of the driver who is seated in the driver's seat 8 on the basis of captured images, and determines a blinking operation of the driver from the plurality of images. The data processing section 6 includes a calculation unit (CPU) 60, a signal storage unit 62, a ROM 64, the RAM 66, an interface (I/F) 68, an output unit 61, and a bus 65. In addition, the data processing section 6 further includes an A/D conversion unit 63. The constituent elements are connected to each other via the bus 65 so as to transmit and receive signals.

The calculation unit 60 is constituted by a CPU, and has functions of processing and analyzing digitally converted image data from the imaging section 4 and of performing processes such as detection of an eye part region and determination of a blinking operation according to programs. The signal storage unit 62 is constituted by a RAM or the like, and preserves image data and can store a processing result, an analysis result, and a determination result of the image data.

The output unit 61 includes, for example, a speaker, a display, and a lamp. The output unit 61 outputs sounds for giving caution or warning to the driver seated in the driver's seat 8 from the speaker on the basis of a determination result of a blinking operation in the data processing section 6. Alternatively, the output unit 61 may output a message or light for giving caution or warning from the display or the lamp. In addition, the output unit 61 may transmit, for example, a signal for operating an automatic brake to an automatic brake system on the basis of a determination result.

A speaker provided in the vehicle 2 may be used as the speaker included in the output unit 61. A display of a car navigation system provided in the vehicle 2 may be used as the display included in the output unit 61.

The A/D conversion unit 63 has a function of converting an image signal captured by the imaging section 4 into digital image data. The image data is output to the interface (I/F) 68. The I/F 68 transmits and receives data and commands to and from the control unit 44, and receives image data therefrom. The ROM 64 is a read only memory, and stores a boot program for starting the eye part detection apparatus 100. A program memory 642 which stores programs for performed processes, analysis and determination is also provided. The programs may be stored not in the ROM 64 but in the signal storage unit 62, and may be stored on a recording medium such as a CD or a DVD. In this case, a recording medium reading unit (not illustrated) is connected to the bus 65. The RAM 66 is used as a cache storage device of the CPU 60, and is also used as a work area when the CPU 60 executes a program for image data. The work area includes the frame memory 662 which stores image data which is captured by the camera 42 and is converted, for each frame, and a template memory 664 which stores a template.

Figure 3:
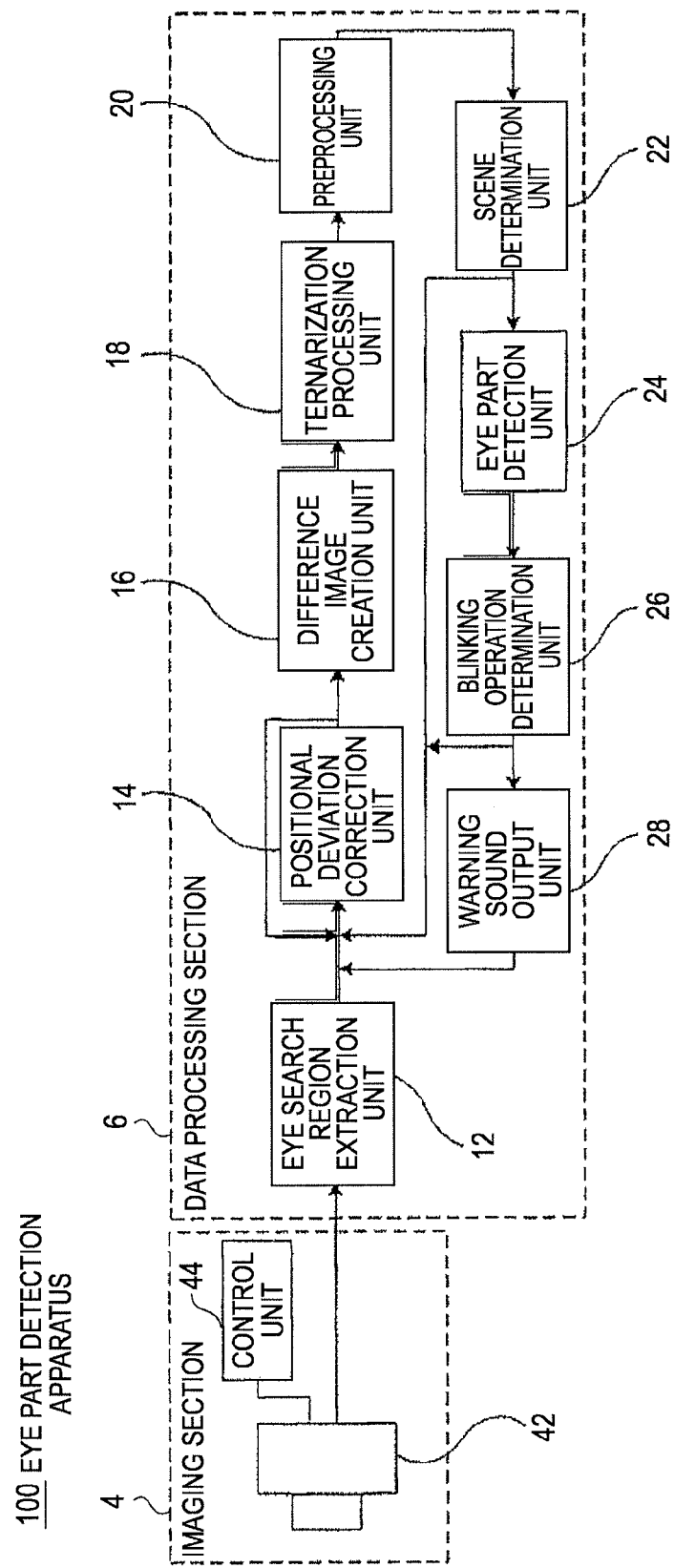
FIG. 3 is a functional block diagram of the eye part detection apparatus according to the embodiment disclosed here.

FIG. 3 is a functional block diagram of the eye part detection apparatus 100 according to the embodiment disclosed here. The eye part detection apparatus 100 is constituted by the imaging section 4 and the data processing section 6. The data processing section 6 includes an eye search region extraction unit 12, a positional deviation correction unit 14, a difference image creation unit 16, a ternarization processing unit 18, a preprocessing unit 20, a scene determination unit 22, an eye part detection unit 24, a blinking operation determination unit 26, and a warning sound output unit 28.

The imaging section 4 captures an image of a region including the driver's face for each predetermined time. An imaging interval of the imaging section may be a general frame rate of moving images, such as an NTSC type or a PAL type. In consideration of the processing performance of the apparatus, a frame interval at which an eye part can be appropriately detected may be determined through a test or the like.

Figure 4:
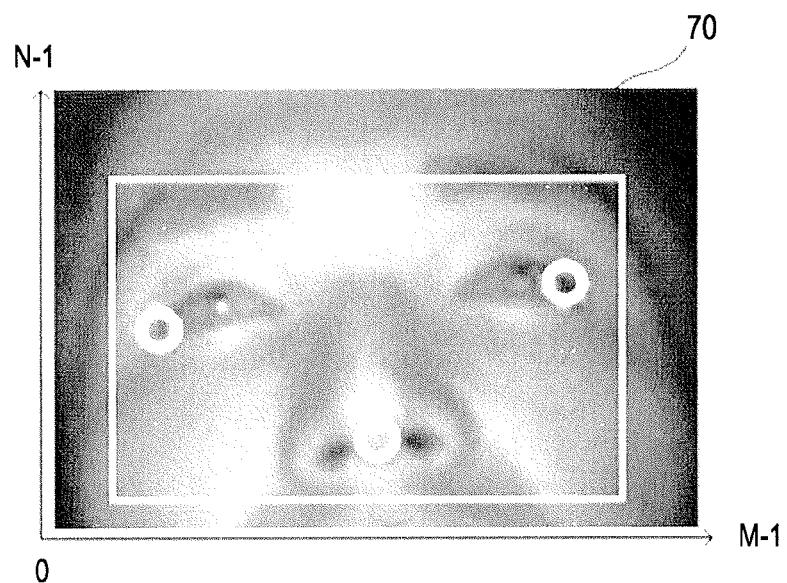
FIG. 4 illustrates an example of an image captured by an imaging section according to the embodiment disclosed here.
Figure 5:
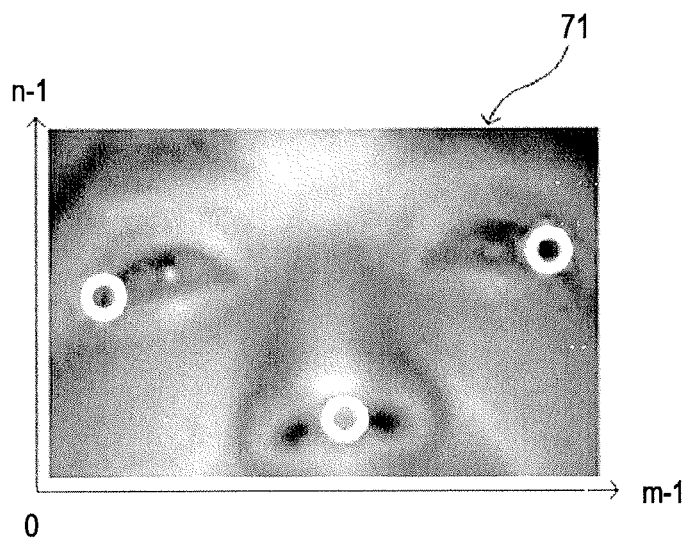
FIG. 5 illustrates an example of an eye search region extracted from FIG. 4.

The captured image is digitalized, and is then input to the eye search region extraction unit 12. The eye search region extraction unit 12 extracts an eye search region from the captured image. The eye search region is a region based on feature points including both eyes and the nose, and is a rectangular region which is circumscribed to the feature points. For example, as illustrated in FIG. 4, ends of both eyes and a nasal apex are extracted as the feature points in a captured image 70, and, as illustrated in FIG. 5, a rectangular region circumscribed to the feature points is extracted as an eye search region 71. The captured image 70 is an M×N image which has M pixels in the horizontal direction and N pixels in the vertical direction and in which the lower left is set to (0,0) and the upper right is set to (M−1,N−1). The eye search region 71 is an m×n image which has m pixels in the horizontal direction and n pixels in the vertical direction and in which the lower left is set to (0,0) and the upper right is set to (m−1,n−1). The eye search region 71 is part of the captured image 70, and thus M>m, and N>n are satisfied. In the present embodiment, a region which is further enlarged in all directions by several dots than the above-described circumscribed rectangular region is determined as the eye search region.

As described above, the feature points include both eyes and the nose. Shapes of both of the eyes greatly vary due to a blinking operation or the like of the driver. On the other hand, even in a case where both eyes are completely closed, a shape of the nose scarcely varies. For this reason, by using the nose as a feature point, frames from which an eye search region can be accurately extracted can be correlated with each other regardless of the variation in shapes of both eyes. By using not only the nose but also edges of both eyes, ends of the eyebrows, and the like as the feature points, it is possible to more accurately extract an eye search region. In other words, positions of the ends of both eyes, and the ends of the eyebrows are substantially constant regardless of the opening and closing of the eyes, and are thus suitable as feature points.

The above-described circumscribed rectangular region may be calculated by using a function for image recognition which is prepared in advance. For example, a library which collects functions related to image recognition is provided in a certain kind of compile type computer program language. The circumscribed rectangular region can be easily calculated by referring to the functions in the library.

Figure 6A:
Figure 6B:
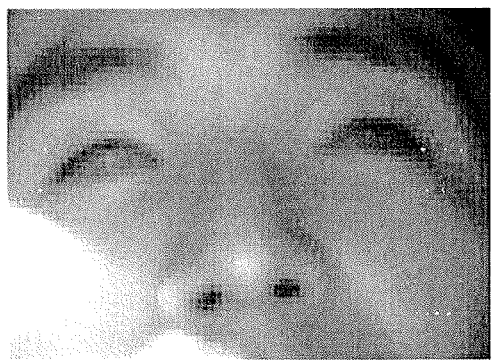

The eye search region extraction unit 12 corrects a luminance value on the basis of an average luminance value in order to smooth a variation in the luminance value of each image. The variation in the luminance value of each image occurs due to the variation in illumination. In the present example, the eye part detection apparatus 100 is mounted in the vehicle 2, and thus illumination varies according to a movement of the vehicle 2. For example, the illumination varies before and after the vehicle 2 passes through a tunnel. FIGS. 6A and 6B illustrate an example of the luminance variation. FIG. 6A illustrates the eye search region 71 right after the vehicle 2 passes through an exit of a tunnel, and FIG. 6B illustrates the eye search region 71 right after the vehicle 2 enters the tunnel from an entrance of the tunnel. It can be confirmed from the drawings that the luminance value of the image greatly varies.

The eye search region extraction unit 12 determines an average luminance value of the eye search region 71 in each frame on the basis of the following computation expressions. First, a frame number is denoted by p, and a luminance value of each eye search region 71 in a p-th frame is denoted by $Q'_p(a,b)$. Here, a and b indicate a pixel position (coordinates) in an m×n image which has m pixels in the horizontal direction and n pixels in the vertical direction and in which the lower left of each image is set to (0,0) and the upper right of each image is set to (m−1,n−1).

An average luminance value of the eye search region 71 in the p-th frame is indicated by $\overline{Q_p}(1)$ and is calculated as follows.

$$\overline{Q_p} = \frac{\sum_{b=0}^{n-1}\sum_{a=0}^{m-1} Q'(a,b)}{m \times n} \tag{2}$$

The eye search region extraction unit 12 corrects the luminance value $Q'_p(a,b)$ of each pixel of the eye search region 71 on the basis of the average luminance. A corrected luminance value $Q_p(a,b)$ of each pixel of the image is expressed as follows.

$$Q_p(a,b) = Q'_p(a,b) - (\overline{Q_p} - \overline{Q_{p-1}}) \tag{3}$$

As another example, luminance values of the entire eye search region 71 may be corrected on the basis of a difference in the luminance value of a certain specific pixel. In the eye search region 71, skin occupies the majority thereof. Therefore, luminance values of a pixel corresponding to the skin in the respective frames are compared with each other, and thus a variation in a luminance value for each frame can be corrected. For example, the eye search region 71 is broader by several dots than the rectangular region circumscribed to the feature points, and thus a pixel of an edge part of the eye search region 71 corresponds to the skin. Therefore, it is possible to correct a luminance value of the eye search region 71 by using a luminance difference in the pixel of the edge part of the eye search region 71. In this method, average luminance is not calculated, and thus a correction process of a luminance value is performed at a high speed. In this example, when coordinates of the pixel of the edge part of the eye search region 71 are set to $(a_0, b_0)$, the corrected luminance value $Q_p(a,b)$ of each pixel of the image is expressed as follows.

$$Q_p(a,b) = Q_p'(a,b) - |Q_p'(a_0,b_0) - Q_{p-1}'(a_0,b_0)| \quad (4)$$

If the eye search region extraction unit 12 corrects the luminance of the eye search regions 71 in two consecutive frames, the two eye search regions 71 are input to the positional deviation correction unit 14.

The positional deviation correction unit 14 corrects a positional deviation of two images. In other words, a positional deviation relative to an eye search region 71 extracted in a p-th frame (an image at a second time) is corrected by using an eye search region 71 extracted in a (p−1)-th frame (an image at a first time).

The positional deviation correction unit 14 can perform positional deviation correction based on comparison between feature points and positional deviation correction based on comparison between eye search regions, that is, by template matching. Either one thereof may be performed.

As described above, the shape of a feature point based on the nose is substantially constant. The nose is located nearly at the center of a human face in the leftward and rightward direction (horizontal direction). For this reason, in a case where a feature point of the nose is considerably deviated in the horizontal direction between two frames, it is predicted that a direction of the face greatly varies. In this case, only one eye may be imaged, or a size or a position of one of both eyes may be imaged so as to notably differ. In such a case, it is difficult to accurately detect an eye part. For this reason, the positional deviation correction unit 14 calculates a positional deviation amount between feature points, and does not perform positional deviation correction if the positional deviation amount is larger than a threshold value Th0.

As mentioned above, in a case where a position of the feature point significantly moves, a subsequent eye part detection process is not performed. The positional deviation correction unit 14 excludes an image which may cause errors in detecting an eye part, from detection targets in advance. In addition, in a case where frames in which the positional deviation amount exceeds the threshold value Th0 are continuously located, there is a possibility that the driver may perform inattentive driving or the like. In this case, the eye part detection apparatus 100 may give warning to the driver.

If the positional deviation amount of the feature point is equal to or smaller than the threshold value Th0, the positional deviation correction unit 14 determines an accurate positional deviation amount by using a template so as to perform positional deviation correction. The positional deviation correction unit 14 performs template matching with the eye search region 71 of the p-th frame by using the eye search region 71 of the (p−1)-th frame as a template so as to determine an accurate positional deviation amount. The template matching is a method of searching for a region having high correlation with the (p−1)-th eye search region 71 in the p-th frame. First, the entire (p−1)-th eye search region 71 is compared with the entire p-th eye search region 71, and is then compared with a region which is shifted by one pixel in the horizontal direction or the vertical direction. The (p−1)-th eye search region 71 is compared with the p-th eye search region 71 until m pixels in the horizontal direction and n pixels in the vertical direction are shifted. In the above-described manner, the positional deviation correction unit 14 determines by how many pixels the eye search region 71 of the p-th frame is moved in the horizontal direction and the vertical direction so as to have the highest degree of correlation with the eye search region 71 of the (p−1)-th frame. A parallel movement distance of the two eye search regions obtained in this way is the positional deviation amount.

As an example of the template matching method, there is a sum of squared difference (SSD) method of calculating a sum total of the squared luminance values of each pixel at the same pixel position. In the SSD method, the similarity between two images is calculated as follows.

$$S_{SSD} = \sum_{b=0}^{n-1} \sum_{a=0}^{m-1} (Q_p(a,b) - Q_{p-1}(a,b))^2 \quad (5)$$

In the template matching according to the SSD method, a smaller calculated value indicates a higher similarity between eye search regions. A positional deviation amount between two eye search regions having the smallest calculated values is calculated.

As another example of the template matching, there is a sum of absolute difference (SAD) method of calculating a sum total of absolute values of differences in luminance values of each pixel. In the SAD method, the similarity between two eye search regions is calculated as follows.

$$S_{SAD} = \sum_{b=0}^{n-1} \sum_{a=0}^{m-1} |Q_p(a,b) - Q_{p-1}(a,b)| \quad (6)$$

Also in the template matching according to the SAD method, a smaller calculated value indicates a higher similarity between images. A positional deviation amount between two eye search regions having the smallest calculated values is calculated.

Similarly, as still another example thereof, there is a normalized cross-correlation (NCC) method. In the NCC method, the correlation between two images is calculated as follows.

$$S_{NCC} = \frac{\sum_{b=0}^{n-1} \sum_{a=0}^{m-1} Q_p(a,b) \cdot Q_{p-1}(a,b)}{\sqrt{\sum_{b=0}^{n-1} \sum_{a=0}^{m-1} (Q_p(a,b))^2 \times \sum_{b=0}^{n-1} \sum_{a=0}^{m-1} (Q_{p-1}(a,b))^2}} \quad (7)$$

$S_{NCC}$ which is a calculated result in the NCC method is a correlation value and thus can take values of −1 or more and 1 or less. A value of $S_{NCC}=1$ indicates that two eye search regions completely coincide with each other, and a value of $S_{NCC}=-1$ indicates that luminance values of two eye search regions are completely reverse to each other. A positional deviation amount between two eye search regions having the greatest $S_{NCC}$ is calculated.

The NCC method includes a ZNCC method in which luminance correction is simultaneously performed during computation of template matching. In the case of this method, the number of steps of the program is reduced, and thus processing is performed at a higher speed than in a typical NCC method. In the ZNCC method, the coincidence between two eye search regions is calculated as follows.

$$S_{ZNCC} = \frac{\sum_{b=0}^{n-1}\sum_{a=0}^{m-1}(Q_p(a,b)-\overline{Q_p})\cdot(Q_{p-1}(a,b)-\overline{Q_{p-1}})}{\sqrt{\sum_{b=0}^{n-1}\sum_{a=0}^{m-1}(Q_p(a,b)-\overline{Q_p})^2 \times \sum_{b=0}^{n-1}\sum_{a=0}^{m-1}(Q_{p-1}(a,b)-\overline{Q_{p-1}})^2}} \quad (8)$$

In the same manner as in the NCC method, also in the ZNCC method, a calculation result of $S_{ZNCC}=1$ indicates that two eye search regions completely coincide with each other, and a calculation result of $S_{ZNCC}=-1$ indicates that luminance values of two eye search regions are completely reverse to each other. A positional deviation amount between two eye search regions having the greatest $S_{ZNCC}$ is calculated.

As still another example of the template matching, there is a phase-only correlation (POC) method. In the POC method, among information pieces obtained by performing Fourier transform on images, the similarity between images is calculated by using only phase information. In this method, a POC function is calculated in the following procedures in order to determine the similarity. First, a Fourier transform coefficient of the eye search region 71 of each frame is calculated.

$$F_{Q_p}(r,s) = \sum_{b=0}^{n-1}\sum_{a=0}^{m-1} Q_p(a,b) W_\alpha^{ar} W_\beta^{bs} \quad (9)$$

Here, $W_\alpha$ and $W_\beta$ are as follows.

$$\begin{cases} W_\alpha = e^{-2j\frac{\pi}{\alpha}} \\ W_\beta = e^{-2j\frac{\pi}{\beta}} \end{cases} \quad (10)$$

Here, j is an imaginary unit. $F_{QP}(r,s)$ is a complex number, and thus a phase component $PH_{QP}(r,s)$ of the eye search region 71 of each frame is as follows.

$$PH(F_{Q_p}(r,s)) = \tan^{-1}\left(\frac{\text{Im}(F_{Q_p}(r,s))}{\text{Re}(F_{Q_p}(r,s))}\right) \quad (11)$$

The POC function corresponds to inverse Fourier transform of a difference in the phase component. From these, phase-only correlation POC(a,b) is calculated as follows.

$$POC(a,b) = \frac{1}{\alpha\beta}\sum_{r=0}^{\alpha-1}\sum_{s=0}^{\beta-1}\left(PH(F_{Q_{p-1}}(r,s)) - PH(F_{Q_p}(r,s))\right)\cdot W_\alpha^{-ar} W_\beta^{-bs} \quad (12)$$

In the template matching based on the phase-only correlation function, if the coincidence between the (p−1)-th eye search region 71 and the p-th eye search region 71 is high, a POC function value has an extremely sharp peak. According to this method, a positional deviation amount is not required to be determined separately, and the coordinates of the peak indicate a positional deviation amount between the (p−1)-th eye search region 71 and the p-th eye search region 71 in the horizontal direction and the vertical direction.

As described above, in the phase-only correlation method, template matching is performed on the basis of phase information of Fourier-transformed data, and thus does not depend on a luminance difference between two images. Therefore, in a case of performing the template matching according to this method, it is not necessary to first perform luminance correction as in the ZNCC method. The computation expression related to the phase-only correlation is a computation expression in a case of a parallel movement. In the present embodiment, since a camera position is not changed, and the face of the operator of the vehicle 2 scarcely moves, it is possible to perform the template matching process at a high speed by using the computation expression.

The template matching methods are programmed, and at least one program is stored in the program memory 642 of the ROM 64. The positional deviation correction unit 14 reads the template matching program from the program memory 642 at the optimum timing, and causes the calculation unit 60 to perform the template matching process.

The description of the template matching method has been made by exemplifying a matching method in a monochrome image, but, needless to say, the template matching method can also be realized in a color image in the same manner. In the case of performing template matching on a color image, the matching process may be performed after the color image is converted into a monochrome image. The matching process may be performed by using any one of red (R), green (G), and blue (B) which are three primary colors. In this case, the human eyes sense green (G) as being brightest. Red (R) is hardly influenced by human skin color. Taking into consideration these characteristics, a color to be used may be determined. The matching process may be performed by using all of R, G, and B. In this case, calculation of the coincidence may be performed by assigning RGB to each pixel in the same order without differentiation between the three colors.

When the positional deviation correction of the eye search region 71 of the (p−1)-th frame and the eye search region 71 of the p-th frame is completed, the two eye search regions 71 having undergone the positional deviation correction are input to the difference image creation unit 16.

Figure 7:
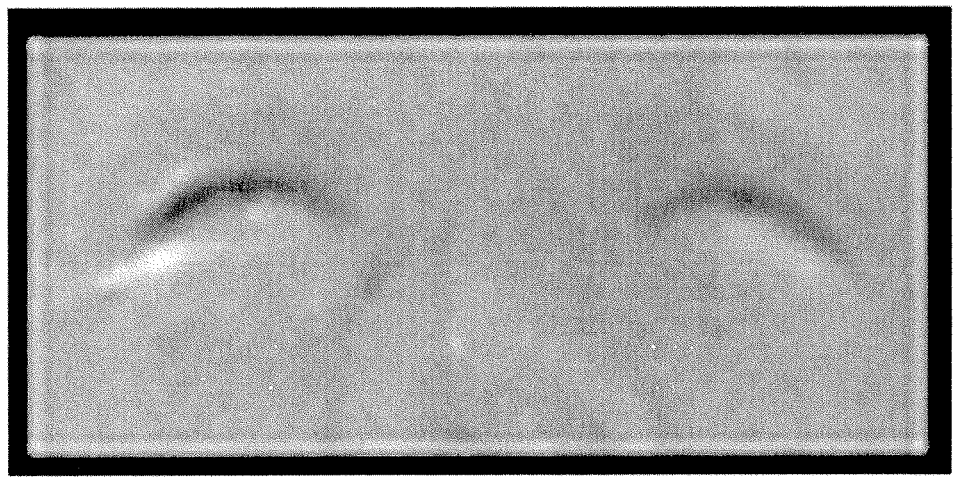
FIG. 7 illustrates an example of a difference image according to the embodiment disclosed here.

The difference image creation unit 16 calculates a difference image $D_p(a,b)$ of each pixel between the eye search region 71 of the (p−1)-th frame and the eye search region 71 of the next frame. An example of the difference image is illustrated in FIG. 7.

The difference image creation unit 16 may perform correction based on luminance of the eye search region 71 before the difference image $D_p(a,b)$ is calculated. For example, if the eye search region extraction unit 12 performs luminance correction by using the edge part of the eye search region 71, and the difference image creation unit 16 performs correction by using average luminance, variations in luminance values of the eye search regions 71 are smoothed with high accuracy. In this case, the average luminance may be calculated from values of $Q'_p(a,b)$ of each pixel, and may be calculated from values of $Q_p(a,b)$ corrected by the eye search region extraction unit 12. Since a luminance value of each pixel corrected by the eye search region extraction unit 12 is obtained by uniformly subtracting a value of a luminance difference with the previous frame at the edge part($a_0,b_0$) from $Q'_p(a,b)$, even in a case where the difference image creation unit 16 performs correction by using either one of the average luminance values, the corrected luminance values of each pixel are the same as each other.

The difference image between the eye search region 71 of the (p−1)-th frame and the eye search region 71 of the next frame is input to the ternarization processing unit 18. The ternarization processing unit 18 converts the difference image into a ternarized image which is a digital image with three grayscales.

Figure 8:
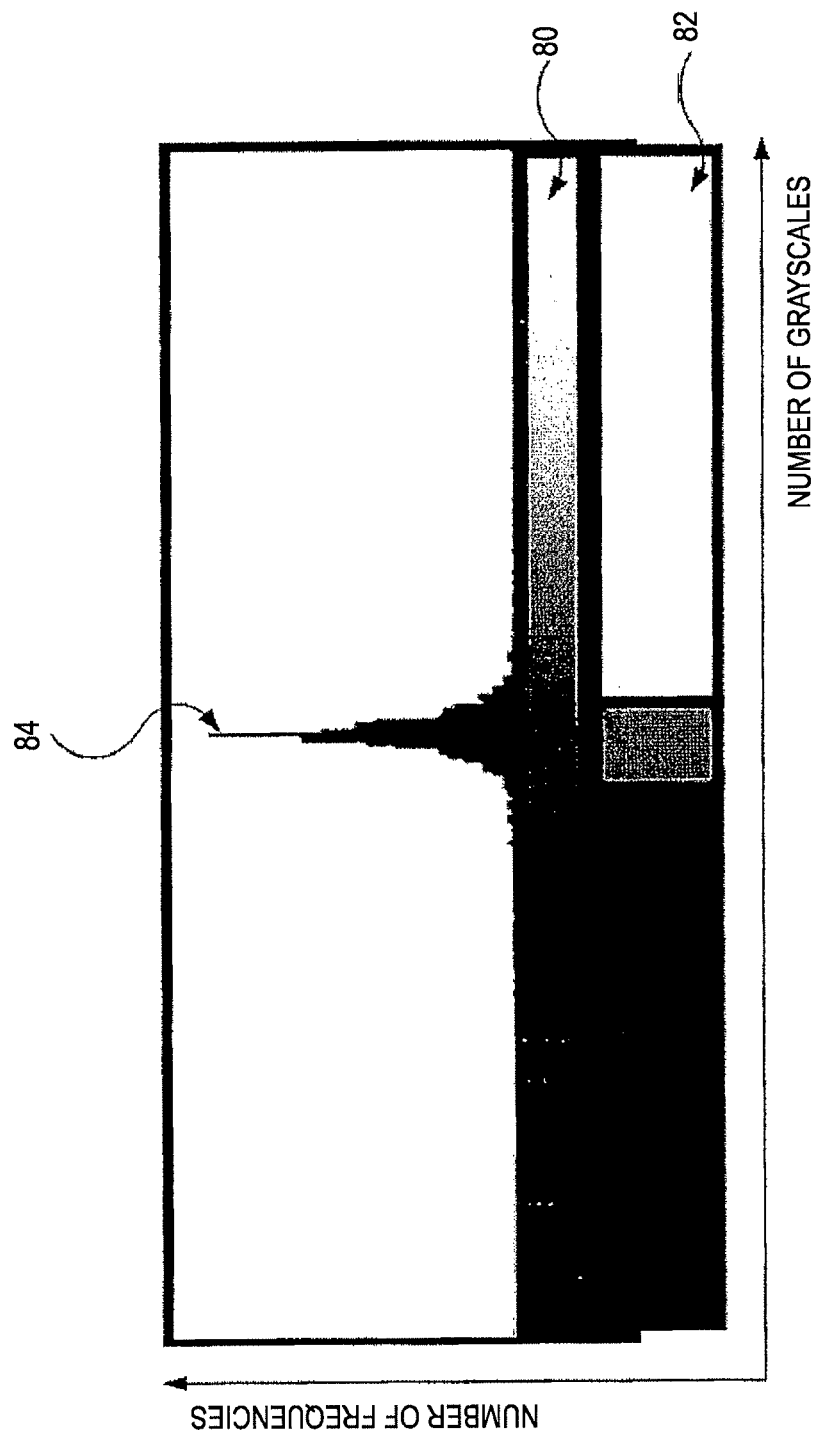
FIG. 8 illustrates an example of a density histogram of the difference image according to the embodiment disclosed here.

The ternarization processing unit 18 creates a difference image density histogram. The histogram indicates a graphed frequency, and is a graph used to understand data distribution circumstances, in which a longitudinal axis expresses the number of frequencies and a transverse axis expresses the number of grayscales. FIG. 8 illustrates an example of the histogram. In FIG. 8, a reference numeral 80 indicates grayscales of luminance of the difference image, and a reference numeral 82 indicates grayscales of luminance of the ternarized image. A columnar graph 84 indicates a frequency distribution in the eye search region 71.

The ternarization processing unit 18 determines a first threshold value u1 and a second threshold value u2 in order to perform ternarization on the basis of the density histogram. Here, for convenience, u1<u2 is assumed.

As an example of a method of determining threshold values, there is a mode method. The mode method is a method in which, in a case where there are two or more peaks corresponding to each of a target object, objects other than the target object, and a background of an image, a position of a valley between the peaks is set as a threshold value in the density histogram. A density histogram in this case has a multi-peak distribution. Classification of both eyes, skin of the face, and others (for example, eyelashes or eyebrows) may occur. Therefore, it is possible to determine a threshold value by using the mode method.

As another example, a so-called minimum error method of determining u1 and u2 which cause an error rate to be minimized may be used. Here, the error rate indicates the probability that a target and objects other than the target are wrongly recognized as a background in a case where ternarization is performed by using the first and second threshold values u1 and u2. In the present embodiment, since an eye part region which is desired to be separated through ternarization can be restricted, a so-called percentile method may be used.

As still another example, there is a method in which, in relation to a peak of a density histogram, a predetermined width is set to both ends of the peak, and then grayscales are divided into three grayscales. The predetermined width may be empirically determined from a test value or the like, and the test value may be sorted by creating a logistic regression analysis model.

Figure 9:
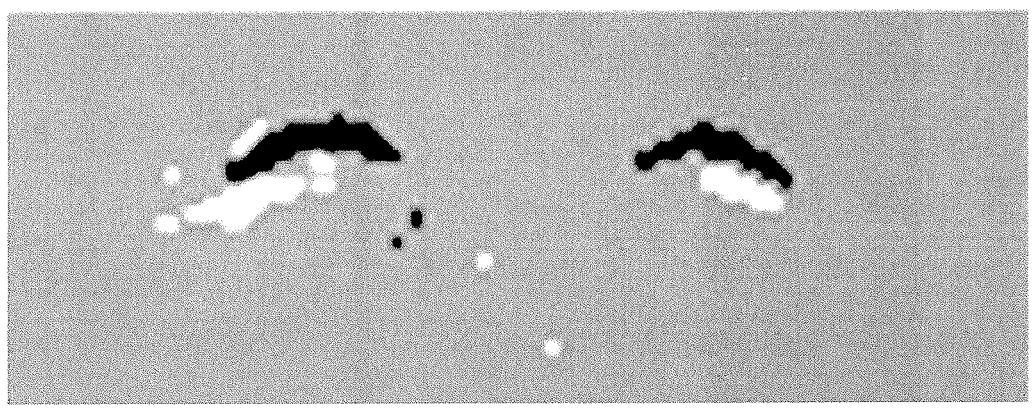
FIG. 9 illustrates an example of a ternarized image according to the embodiment disclosed here.

The ternarization processing unit 18 creates a ternarized image $D^3_p(a,b)$ from the difference image $D_p(a,b)$ by using the first and second threshold values u1 and u2 determined in the above-described manner. FIG. 9 illustrates an example of the ternarized image. In FIG. 9, a region of $D^3_p(a,b)=0$ is shown black, a region of $D^3_p(a,b)=2$ is shown white, and a region of $D^3_p(a,b)=1$ is shown gray.

The black region ($D^3_p(a,b)=0$) of the ternarized image indicates a region which becomes darker than in the previous frame. Similarly, the white region ($D^3_p(a,b)=2$) indicates a region which becomes brighter, and the gray region ($D^3_p(a,b)=1$) indicates a region which changes little. For example, if the eyes are closed, an eye part image becomes brighter, and is represented as $D^3_p(a,b)=2$ in a ternarized image. If the eyes are open, the eye part image becomes darker, and is represented as $D^3_p(a,b)=0$ in the ternarized image. Opening and closing operation of the eyes can be detected as a white region and a black region in a binarized image as well, but can be detected with high accuracy through such ternarization. The ternarized image generated in the above-described manner is input to the preprocessing unit 20.

Figure 10:
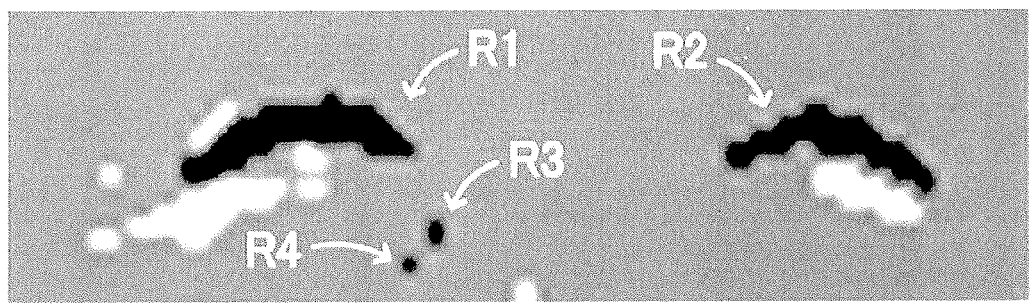
FIG. 10 illustrates an example in which difference regions are numbered in descending order of an area in the ternarized image according to the embodiment disclosed here.

The preprocessing unit 20 clusters pixels which correspond to $D^3_p(a,b)=0$ of the ternarized image which become darker and are adjacent to each other, and extracts regions of the clustered pixels. The preprocessing unit 20 rearranges the extracted regions as R1 to Rc in descending order of an area (the number of pixels). Pixels corresponding to $D^3_p(a,b)=2$ of the ternarized image which become brighter can also be extracted as a region in the same manner. In FIG. 10, four regions R1 to R4 are extracted from the ternarized image which becomes darker, and it is confirmed that the two regions R1 and R2 having a larger area indicate eye parts. Here, the number of pixels of the region R3 and the region R4 is smaller than a predetermined threshold value, and thus the regions are treated as noise and are excluded.

Figure 11A:
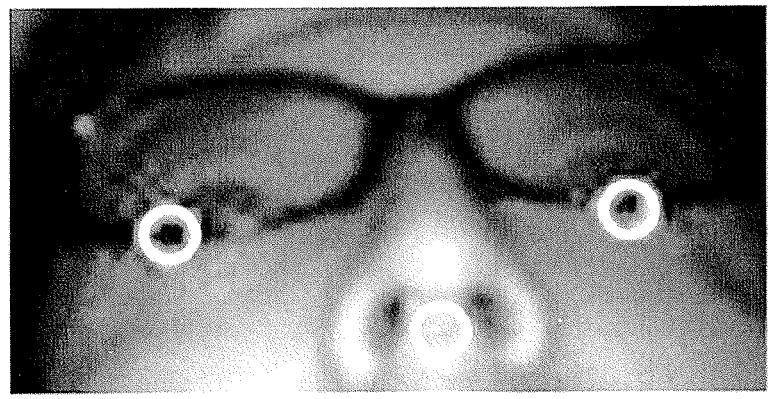
Figure 11B:

An example of noise may include a case where a driver wears glasses or the like. If the driver changes a direction of his or her face (for example, yawing of the face with respect to a vehicle traveling direction), luminance of the glass frames or the like significantly varies. FIGS. 11A and 11B illustrate an example of noise in a ternarized image when the driver wears glasses. In FIG. 11B illustrating a ternarized image of the glass frames, a plurality of regions having small areas are illustrated. These regions are treated as regions other than eye parts so as to be removed as noise.

In other words, according to the present embodiment, the preprocessing unit 20 determines noise on the basis of a size of a region, and thus the noise can be excluded from a subsequent process target. Therefore, also in this case, an eye part region can be accurately detected.

The total number of regions R1, R2, ..., and Rc corresponding to $D^3_p(a,b)=0$, a sum total of areas thereof, and information on positions and areas are input to the scene determination unit 22 for each frame. The number of eye part regions is typically two, and if a total number of regions is too large, certain noise may be included therein. For this reason, the scene determination unit 22 excludes a frame in which a total number of regions is large, from a subsequent eye part detection process. Similarly, a rough area of eye part regions can be estimated. Therefore, in a case where an area of regions corresponding to $D^3_p(a,b)=0$ is greater than a predefined value, there is a high possibility that noise and the like may be mixed with an image due to specific disturbances, and thus the scene determination unit 22 excludes a ternarized image in which the area of all regions is great from a subsequent eye part detection process.

As mentioned above, in the present embodiment, a difference image with which noise or the like may possibly be mixed is excluded, and thus it is possible to more accurately detect an eye part.

A ternarized image which is not excluded by the scene determination unit 22 is input to the eye part detection unit 24. The number of human eyes is typically two, and relative positions of the eyes in the vertical direction are substantially the same as each other. In addition, in a typical imaging state, a distance between the eyes in the horizontal direction is within a predetermined range. For this reason, the eye part detection unit 24 extracts two regions in descending order of the area thereof, and determines whether or not the regions are eye parts from the relative positions of the two regions. In a case where the relative positions of the two regions do not match a predefined condition, it is determined whether or not the second largest two regions are eye parts. In a case where relative positions of the two regions in the vertical direction and the horizontal direction are within a predetermined range, it is determined that the two regions are eye parts.

In order to calculate the positions of the two extracted regions, as an example, a histogram may be used in relation to the position of each pixel included in each region. The eye part detection unit 24 may determine a coordinate value which appears most frequently in each region as a center of the region in the horizontal direction and the vertical direction, and may compare positions in the horizontal direction and the vertical direction with the center.

As another example of comparison of positions of two extracted regions in the vertical direction, there is a method in which the eye part detection unit 24 determines a centroid of a region as a center of each region, and compares positions in the horizontal direction and the vertical direction with the center.

Figure 12:
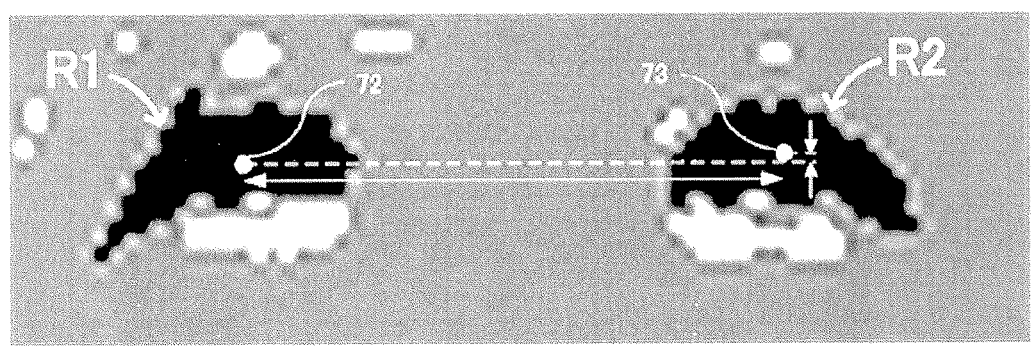
FIG. 12 illustrates an example in which two regions are compared with each other in the ternarized image according to the embodiment disclosed here.

FIG. 12 illustrates an example of two regions. In FIG. 12, positions of a centroid 72 of a region R1 and a centroid 73 of a region R2 in the vertical direction are substantially the same as each other, and a distance between the regions R1 and R2 in the horizontal direction is within a predetermined range. Areas of the regions R1 and R2 are also substantially the same as each other. Therefore, the eye part detection unit 24 may determine a combination of the region R1 and the region R2 illustrated in FIG. 12 as eye parts. The eye part regions determined in the above-described manner may be used for facial recognition.

A ternarized image including regions determined as eye parts is input to the blinking operation determination unit 26. The blinking operation determination unit 26 determines a blinking operation by using ternarized images of a plurality of frames. The blinking operation determination unit 26 observes time variation in the luminance of regions determined as eye parts so as to determine a blinking operation. The blinking operation is an operation in which eyelids are closed and are then opened for a short period of time. In a ternarized image, if each eyelid is closed, an area of a white eye part region gradually increases, and if the eyelid is opened, an area of a black eye part region gradually increases. For example, dozing off while driving may be determined on the basis of the blinking operation determined in the above-described manner. Generally, it is said that a human wakefulness level and a blinking operation have a correlation with each other. Therefore, a blinking operation is detected, and thus a possibility of dozing off while driving can be detected. In a case where there is a possibility of dozing off while driving, the blinking operation determination unit 26 sends a signal to the warning sound output unit 28. When the signal is received from the blinking operation determination unit 26, the warning sound output unit 28 outputs warning.

Figure 13:
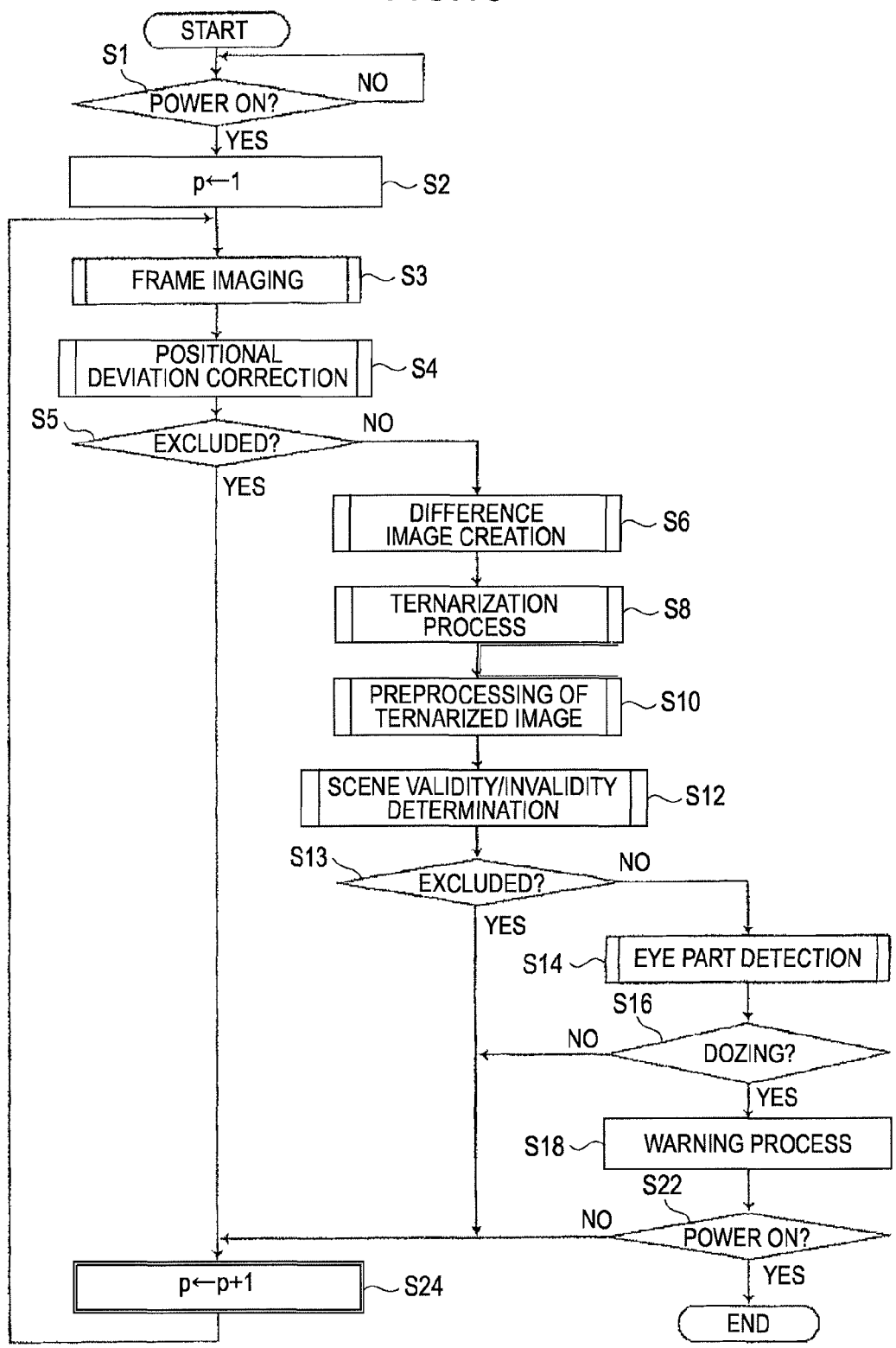
FIG. 13 is a flowchart illustrating a schematic process of an eye part detection method according to the embodiment disclosed here.

Next, an eye part detection method according to the embodiment disclosed here will be described. FIG. 13 is a flowchart illustrating a schematic process of the eye part detection method. First, when the ignition of the vehicle is turned on, and thus power is supplied to the eye part detection apparatus 100 (YES in step S1), the calculation unit 60 sets p=1 as a frame number p in the entire eye part detection apparatus 100 (step S2). The imaging section 4 captures the image 70, and the A/D conversion unit 63 digitalizes the image. The digitalized image is input to the eye search region extraction unit 12. The eye search region extraction unit 12 performs extraction of the eye search region 71 and luminance correction (step S3).

The positional deviation correction unit 14 compares feature points of the eye search region 71 of the (p−1)-th frame and the eye search region 71 of the p-th frame with each other, further performs template matching with the p-th frame by using the eye search region 71 of the (p−1)-th frame as a template, and corrects a position in a case where a positional deviation amount is equal to or smaller than a predetermined threshold value (step S4). If the positional deviation amount is larger than the predetermined threshold value, the positional deviation correction unit 14 excludes a corresponding frame from a subsequent process target.

A frame which is not excluded by the positional deviation correction unit 14 is input to the difference image creation unit 16 (NO in step S5). The difference image creation unit 16 calculates a difference for each pixel of the eye search region 71 of the (p−1)-th frame and the eye search region 71 of the p-th frame so as to create a difference image (step S6). The ternarization processing unit 18 converts the difference image into a ternarized image (step S8).

The preprocessing unit 20 numbers regions of the ternarized image in descending order of an area in a frame (step S10), and the scene determination unit 22 excludes a frame in which a total area and a total number of respective regions exceed predetermined values (step S12).

A frame which is not excluded by the scene determination unit 22 is input to the eye part detection unit 24 (NO in step S13). The eye part detection unit 24 determines eye part regions. A frame including regions determined as the eye part regions is stored in the signal storage unit 62 (step S14).

The blinking operation determination unit 26 detects a blinking operation by using consecutive frames so as to determine a wakefulness state of the driver. In a case where the blinking operation determination unit 26 determines that there is a possibility of dozing off while driving, the warning sound output unit 28 outputs a warning.

The eye part detection apparatus 100 repeatedly performs the processes in steps S3 to S22 until power is turned off. The eye search region extraction unit 12 performs extraction of the eye search region 71 of a (p+1)-th frame and luminance correction. The positional deviation correction unit 14 compares feature points of the eye search region 71 of the p-th frame and the eye search region 71 of the (p+1)-th frame with each other, and performs template matching between the eye search region 71 of the p-th frame and the eye search region 71 of the (p+1)-th frame. Also in cases where the positional deviation correction unit 14 excludes a frame, the scene determination unit 22 excludes a frame, and the blinking operation determination unit 26 determines that there is no possibility of dozing off while driving, the eye part detection apparatus 100 repeatedly performs the processes in steps S3 to S22.

Hereinafter, the processes in step S3 to S14 will be described in detail. Each process can be performed independently by the respective functional processing units, and is performed through cooperation of the functional processing units during the supply of power.

Figure 14:
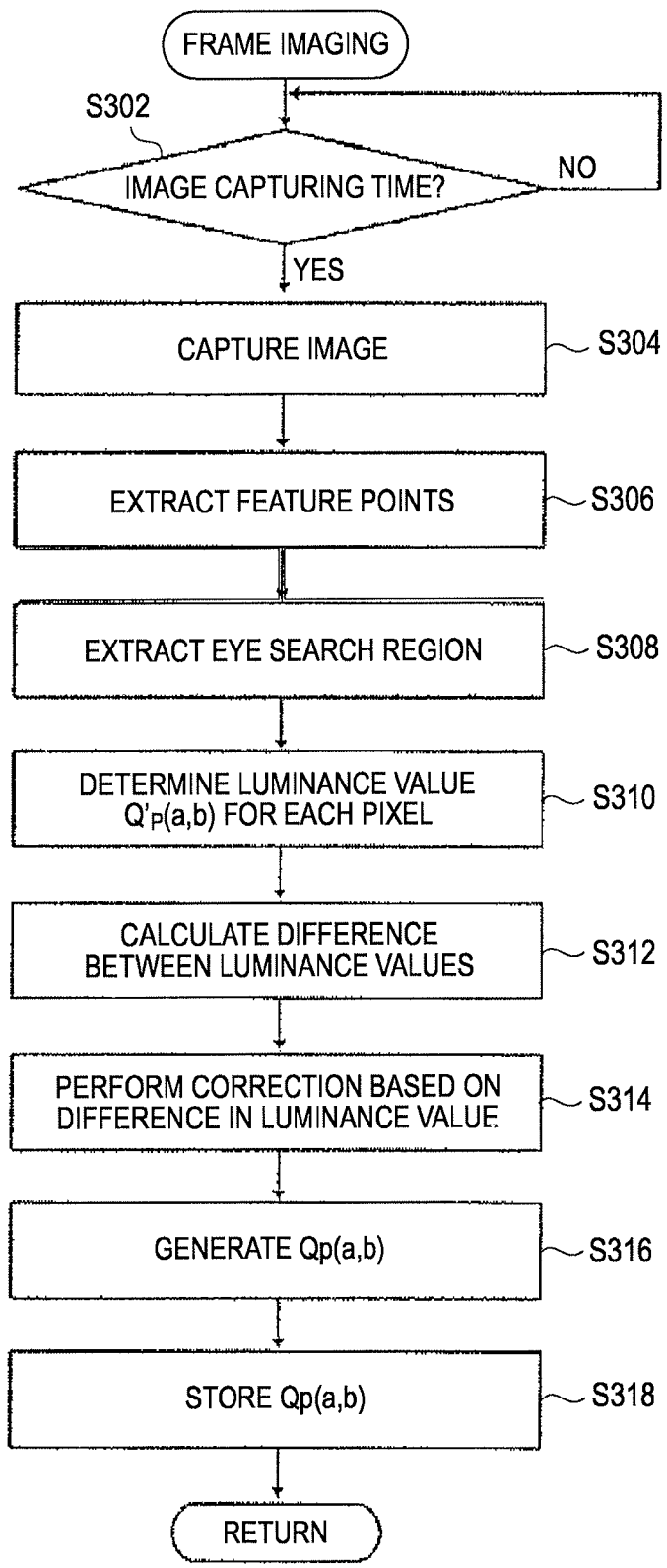
FIG. 14 is a flowchart illustrating details of frame imaging according to the embodiment disclosed here.

FIG. 14 is a flowchart illustrating details of the frame imaging (step S3). In step S1, when power is supplied, the eye part detection apparatus 100 is in a standby state until an image capturing timing arrives (NO in step S302). When the image capturing timing occurs (YES in step S302), the control unit 44 of the imaging section 4 sends a signal for capturing an image to the camera 42. The camera 42 captures an image of the face (step S304), and the A/D conversion unit 63 digitalizes the captured image. The digitalized image 70 of the face is temporarily stored in the frame memory 662 of the RAM 66 via the I/F 68.

If an imaging time of the next frame elapses (YES in step S302), the control unit 44 sends a signal for capturing an image to the camera 42 again.

When a new image is stored in the frame memory 662, the eye search region extraction unit 12 extracts feature points of an eye search region from the stored image (step S306) so as to extract the eye search region (step S308).

Next, the eye search region extraction unit 12 calculates the luminance value $Q'_p(a,b)$ of each pixel of a frame stored in the frame memory 662 (step S310).

The eye search region extraction unit 12 calculates a difference between a luminance value $Q'_{p-1}(a_0,b_0)$ of the edge part $(a_0,b_0)$ of the eye search region 71 of the (p−1)-th frame and a luminance value $Q'_p(a_0,b_0)$ of the edge part $(a_0,b_0)$ of the eye search region 71 of the p-th frame (step S312) so as to correct a luminance value of the eye search region 71 of the p-th frame on the basis of the difference between the luminance values (step S314), and generates the corrected luminance value $Q_p(a,b)$ of each pixel (step S316). In addition, the corrected luminance value $Q_p(a,b)$ is stored in the signal storage unit 62 (step S318).

When an image is stored in the signal storage unit 62, the signal storage unit 62 stores an imaging time and the corrected luminance $Q_p(a,b)$ of the eye search region 71 for each frame. Successively, the eye search region extraction unit 12 returns the process to the flowchart of FIG. 13 so that the positional deviation correction process (step S4) is performed.

Figure 15:
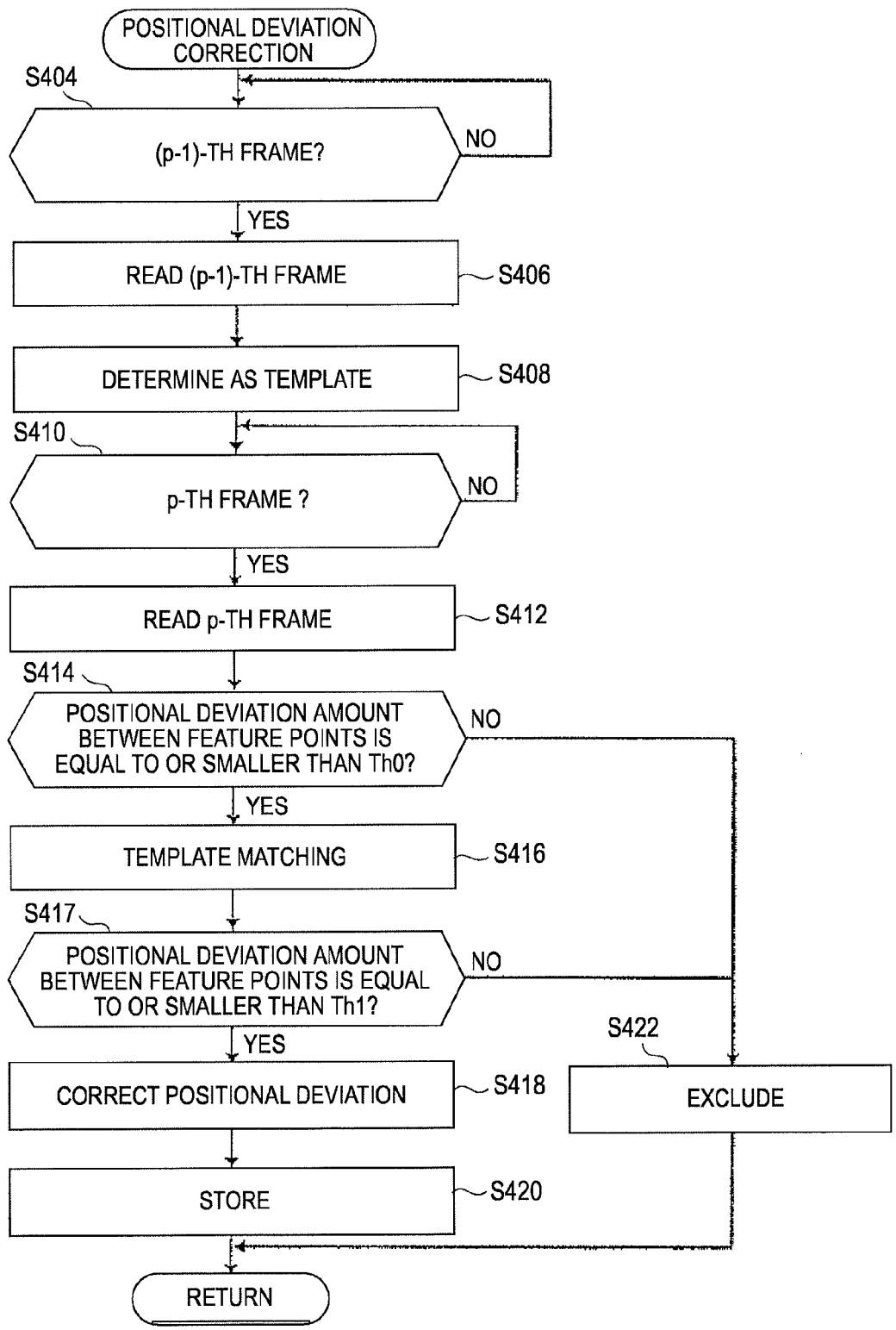
FIG. 15 is a flowchart illustrating details of a positional deviation correction process according to the embodiment disclosed here.

FIG. 15 is a flowchart illustrating details of the positional deviation correction process (step S4).

If the eye search region 71 of the (p−1)-th frame is not stored in the signal storage unit 62 (NO in step S404), the positional deviation correction unit 14 remains in a standby state until the eye search region 71 of the (p−1)-th frame is stored. If the eye search region 71 of the (p−1)-th frame is stored (YES in step S404), the positional deviation correction unit 14 reads the eye search region 71 of the (p−1)-th frame which is stored (step S406), and determines the eye search region 71 of the (p−1)-th frame as a template (step S408).

Next, the positional deviation correction unit 14 returns to a standby state if the eye search region 71 of the p-th frame is not stored in the signal storage unit 62 (NO in step S410). If the eye search region 71 of the p-th frame is extracted (YES in step S410), the positional deviation correction unit 14 reads the image $Q_p(a,b)$ of the p-th frame (step S412).

The positional deviation correction unit 14 compares the coordinates of a feature point in the eye search region 71 of the (p−1)-th frame with the coordinates of a feature point in the eye search region 71 of the p-th frame (step S414). If a positional deviation amount between the feature points of the two regions is equal to or smaller than the threshold value Th0 (YES in step S414), the positional deviation correction unit 14 performs template matching with the eye search region 71 of the p-th frame by using the eye search region 71 of the (p−1)-th frame as a template (step S416). If a positional deviation amount calculated through the template matching is equal to or smaller than the threshold value Th1 (YES in step S417), the positional deviation correction unit 14 corrects a positional deviation (step S418). The positional deviation correction unit 14 stores the eye search region 71 of the (p−1)-th frame and the eye search region 71 of the p-th frame in the signal storage unit 62 (step S420). Next, the positional deviation correction unit 14 hands over the process to the difference image creation unit 16, and thus the difference image creation process (step S6) is performed.

The positional deviation correction unit 14 stores the eye search region 71 of the (p−1)-th frame, and the eye search region 71 of the p-th frame having undergone the positional deviation correction, in the signal storage unit 62.

If the positional deviation amount of the feature points of the two regions is larger than the threshold value Th0 (NO in step S414), the positional deviation correction unit 14 excludes a corresponding frame from the subsequent process (step S422). If the positional deviation amount calculated through the template matching is larger than the threshold value Th1 (NO in step S417), a corresponding frame is excluded from the subsequent process (step S422). Since the eye search region 71 of the p-th frame has been stored (YES in step S404), the positional deviation correction unit 14 reads the eye search region 71 of the p-th frame (step S406), and performs processes in steps S408 to S422.

Figure 16:
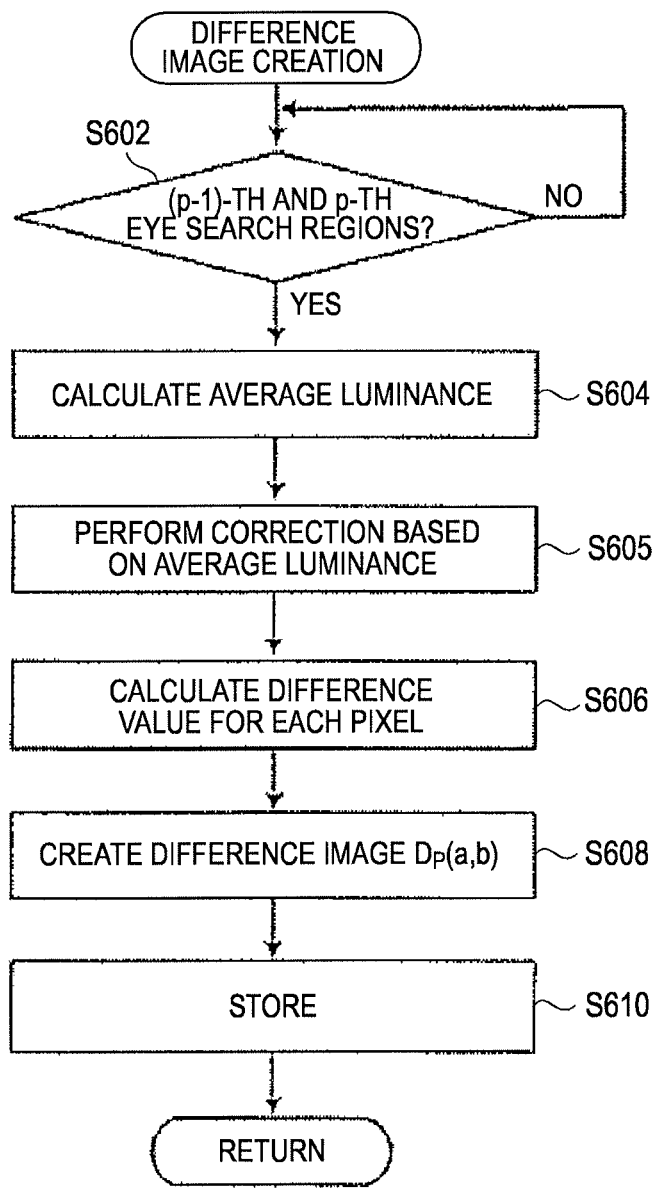
FIG. 16 is a flowchart illustrating details of a difference image creation process according to the embodiment disclosed here.

FIG. 16 is a flowchart illustrating details of the difference image creation process (step S6).

The difference image creation unit 16 is in a standby state until two regions including the eye search region 71 of the (p−1)-th frame and the eye search region 71 of the p-th frame are stored in the signal storage unit 62 (step S602). If the eye search region 71 of the (p−1)-th frame and the eye search region 71 of the p-th frame are stored (YES in step S602), the difference image creation unit 16 reads the two eye search regions 71.

The difference image creation unit 16 calculates average luminance from the luminance value $Q_p(a,b)$ (step S604) so as to correct images on the basis of the average luminance, and updates the luminance value $Q_p(a,b)$ to a corrected luminance value of each pixel (step S605).

The difference image creation unit 16 calculates a difference value for each pixel between the (p−1)-th eye search region 71 and the p-th eye search region 71 (step S606). After the difference value for each pixel is calculated, the difference image creation unit 16 creates the difference image $D_p(a,b)$ in which the difference value for each pixel is stored (step S608). The difference image creation unit 16 stores the difference image $D_p(a,b)$ in the signal storage unit 62 (step S610). Next, the difference image creation unit 16 hands over the process to the ternarization processing unit 18 so that the ternarization process (step S8) is performed.

Figure 17:
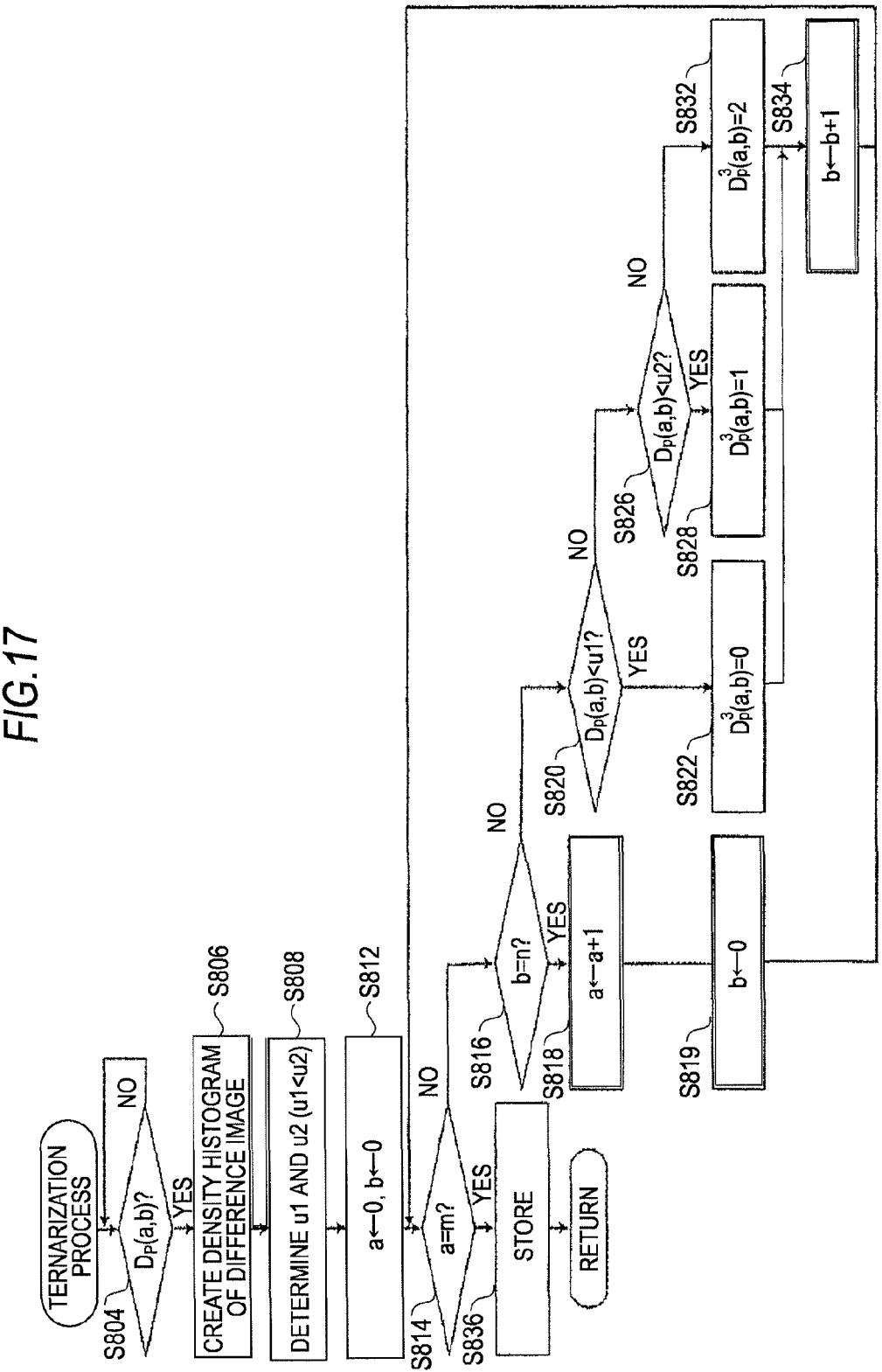
FIG. 17 is a flowchart illustrating details of ternarization of the difference image according to the embodiment disclosed here.

FIG. 17 is a flowchart illustrating details of the ternarization process for ternarizing the difference image.

The ternarization processing unit 18 remains in a standby state if the difference image $D_p(a,b)$ is not stored in the signal storage unit 62 (NO in step S804). If the difference image $D_p(a,b)$ is stored in the signal storage unit 62 (YES in step S804), the ternarization processing unit 18 reads the difference image $D_p(a,b)$.

The ternarization processing unit 18 creates a density histogram of the difference image (step S806), and determines the first threshold value u1 and the second threshold value u2 for ternarization on the basis of the density histogram (step S808). Here, u1<u2 is assumed.

Next, the ternarization processing unit 18 prepares for the arrangement $D^3_p(a,b)$ for storing a ternarized image, and sets the variables a and b to 0 (step S812). The ternarization processing unit 18 determines whether or not the variable a reaches the total number m of pixels in the horizontal direction of the eye search region (step S814). In this case, since the variable a is 0 (NO in step S814), the ternarization processing unit 18 determines whether or not the variable b reaches the total number n of pixels in the vertical direction of the eye search region (step S816). Since the variable b is 0, the ternarization processing unit 18 performs processes in steps S820 to S834 of the ternarization process.

In step S820, the ternarization processing unit 18 compares a value of the difference image $D_p(a,b)$ with the first threshold value u1. If the difference image $D_p(a,b)<u1$ (YES in step S820), the ternarization processing unit 18 sets $D^3_p(a,b)=0$ (step S822), and if the difference image $D_p(a,b)<u2$ (YES in step S826), the ternarization processing unit 18 sets $D^3_p(a,b)=1$ (step S828). If the difference image $D_p(a,b)>u2$ (NO in step S826), the ternarization processing unit 18 sets $D^3_p(a,b)=2$ (step S832).

In step S814, the ternarization processing unit 18 repeatedly performs the ternarization process of the difference image (steps S820 to S834) until the variable a reaches the total number m of pixels in the horizontal direction of the eye search region (YES in step S814) and the variable b reaches the total number n of pixels in the vertical direction of the eye search region (YES in step S816). If the ternarization process on the total pixels of m×n of the eye search region is completed in the above-described manner (YES in step S814 and YES in step S816), the ternarization processing unit 18 stores the ternarized image $D^3_p(a,b)$ in the signal storage unit 62 (step S836). Next, the ternarization processing unit 18 hands over the process to that shown in a flowchart of FIG. 18 so that the preprocessing (step S10) for scene validity/invalidity determination is performed.

FIG. 18 is a flowchart illustrating details of the preprocessing (step S10) for determining validity/invalidity of a scene in determination of eye part regions. In FIG. 18, the preprocessing will be described by exemplifying a region of the ternarized image $D^3_p(a,b)=0$. The same process can also be performed in a case of $D^3_p(a,b)=2$.

The preprocessing unit 20 is in a standby state until the ternarized image $D^3_p(a,b)$ is stored in the signal storage unit 62 (step S1004), and reads the ternarized image $D^3_p(a,b)$ if the ternarized image $D^3_p(a,b)$ is stored (YES in step S1004).

The preprocessing unit 20 extracts all pixels corresponding to $D^3_p(a,b)=0$ from the ternarized image $D^3_p(a,b)$ (step S1006). The preprocessing unit 20 clusters (groups) pixels which correspond to $D^3_p(a,b)=0$ and are adjacent to each other (or located in a predetermined distance) so as to extract regions of $D^3_p(a,b)=0$ (step S1008). Here, it is assumed that regions R'1 to R'd are determined.

The preprocessing unit 20 counts the number of pixels included in each of the regions R'1 to R'd (step S1010), and compares the counted number of pixels with a threshold value y0 (step S1012).

If the counted number of pixels is compared with the threshold value y0, and the counted number of pixels is equal to or larger than the threshold value y0 (YES in step S1012), the preprocessing unit 20 determines the region as a subsequent process target. After the comparison of all the regions R'1 to R'd is completed, the preprocessing unit 20 numbers the regions in descending order of an area (that is, in an order in which the number of pixels in the region is larger) in relation to the regions which are determined as the subsequent process targets (step S1014). In this case, the preprocessing unit 20 numbers the regions as R1 to Rc in descending order of an area. The preprocessing unit 20 stores region information regarding a predetermined number of regions in descending order of an area, and a total number of regions (that is, the maximum number of the numbered regions) in the signal storage unit 62. Next, the preprocessing unit 20 hands over the process to the scene determination unit 22 so that the scene validity/invalidity determination process (step S12) is performed.

If the counted number of pixels is smaller than the threshold value y0 (NO in step S1012), the preprocessing unit 20 determines the region as noise, and excludes the region from a subsequent process target (step S1018). The threshold value y0 is a number which is smaller than the number of pixels which clearly indicates an eye part, and may be empirically determined from a test value or the like. Next, the preprocessing unit 20 returns the process to that shown in the flowchart of FIG. 13, and the scene validity/invalidity determination process (step S12) is performed.

FIG. 19 is a flowchart illustrating details of the scene validity/invalidity determination process (step S12).

The scene determination unit 22 is in a standby state until the region information regarding a predetermined number of regions of the p-th frame and a total number of regions are stored in the signal storage unit 62 (step S1204). If the region information regarding a predetermined number of regions of the p-th frame and a total number of regions are read from the signal storage unit 62 (YES in step S1204), the scene determination unit 22 performs processes in step S1206 and subsequent steps.

The scene determination unit 22 compares the total number of regions with a threshold value y1 (step S1206), and excludes the corresponding frame from the process (step S1208) if the total number of regions is equal to or larger than the threshold value y1 (NO in step S1206). The number of human eyes is two, and thus y1 is a number larger than 2. In a case where a total number of regions is large, there is a high possibility that noise may be wrongly detected as a region, and thus a frame including such a region is excluded.

The scene determination unit 22 compares a sum total of areas of the regions with a threshold value y2 (step S1212).

If the sum total of areas of the regions is greater than the threshold value y2 (NO in step S1212), the scene determination unit 22 determines the frame as being invalid (step S1208). Here, the threshold value y2 may be determined on the basis of the sum total of areas of eye part regions in a typical imaging state. As mentioned above, regions in which a sum total of areas are equal to or greater than a predetermined value are excluded, and thus it is possible to prevent regions other than eye part regions, such as the lenses of glasses, from being wrongly detected as the eye part regions in advance.

If the sum total of areas of the regions is equal to or smaller than the threshold value y2 (YES in step S1212), the scene determination unit 22 determines the frame as being valid (step S1214), and stores the frame in the signal storage unit 62 as a subsequent process target (step S1216). Next, the scene determination unit 22 returns the process to FIG. 13, and the eye part detection process (step S14) is performed.

Figure 20:
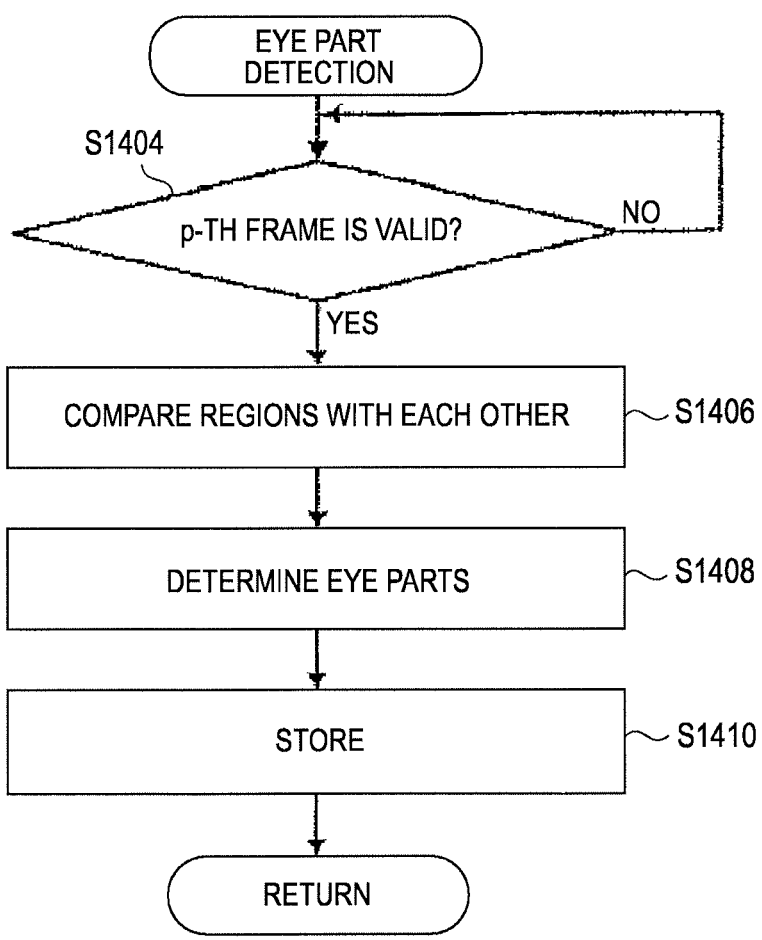
FIG. 20 is a flowchart illustrating details of an eye part detection process according to the embodiment disclosed here.

FIG. 20 is a flowchart illustrating details of the eye part detection process (step S14).

If the frame determined as being valid is stored in the signal storage unit 62 (YES in step S1404), the eye part detection unit 24 then reads the ternarized image $D^3_p(a,b)$ of the p-th frame.

The eye part detection unit 24 compares positions of two regions in the horizontal direction and the vertical direction in the regions R1 to Rc (step S1406). The eye part detection unit 24 determines a set of regions whose positions in the horizontal direction and the vertical direction are within a predetermined range and which have the smallest area difference therebetween, as eye part regions (step S1408).

The regions R1 to Rc have the number of pixels suitable as eye regions, and thus it is possible to appropriately determine eye part regions by comparing areas thereof with each other. Since the eyes are sites in which luminance varies greatest in sites constituting the face, eye part regions may be determined by comparing positions in the horizontal direction and the vertical direction of the two regions R1 and R2 having large areas with each other. Since both eyes have similar shapes, a correlation value regarding shapes of two regions may be calculated, and two regions which are the most similar to each other may be determined as eye part regions. The eye part detection unit 24 stores coordinate information of pixels of the two eye part regions in the signal storage unit 62 (step S1410). Next, the eye part detection unit 24 hands over the process to the blinking operation determination unit 26.

The blinking operation determination unit 26 reads the p-th ternarized image $D^3_p(a,b)$ and the coordinate information of pixels of the eye part regions from the signal storage unit 62. The blinking operation determination unit 26 detects the number of frames in one blinking operation. The blinking operation may be detected on the basis of a time variation in luminance of the eye part regions. If the number of frames in the one blinking operation is equal to or larger than a threshold value $TH_{blink}$, the blinking operation determination unit 26 outputs a warning sound.

As described above, in the eye part detection apparatus according to the present embodiment, an eye search region is set with the nose as a reference, and thus an eye part region can be accurately detected even in a case where the shape of a face varies.

Since template matching is performed by using an eye search region of the previous frame as a template, it is possible to accurately calculate a positional deviation amount. Since luminance of an eye search region is corrected on the basis of a difference in the luminance of at least one pixel of an edge part of the eye search region of the previous frame, it is possible to perform a process of correcting a luminance difference between frames at a high speed. Since the average luminance of an eye search region is calculated, and luminance of the eye search region is corrected on the basis of the average luminance, it is possible to accurately detect eye part regions even in a case where ambient illumination varies between frames. Since, in the eye search regions of two consecutive frames, a luminance difference value is calculated for respective correlated pixels, and the difference value is ternarized, it is possible to accurately detect a case where the eyelids are closed and a case where the eyelids are open. In a ternarized image of a difference between eye search regions, a pair of regions in which relative positions in the horizontal direction and the vertical direction satisfy a predetermined condition is determined as eye part regions. Since the human eyes are within a predetermined range in the horizontal direction, and heights thereof in the vertical direction are substantially the same as each other, it is possible to accurately detect eye part regions by comparing relative positions in the horizontal direction and the vertical direction.

Since eye regions are detected on the basis of a total number of regions in which a difference occurs in an eye search region, and the total area of the regions, an image in which noise is considerable can be excluded, and thus eye part regions can be accurately determined, even in a case where a driver wears glasses or the like.

This disclosure is not limited to the above-described embodiment, and may be appropriately modified within the scope without departing from the spirit of this disclosure.

For example, the eye part detection apparatus is installed in a vehicle as an example, but may be installed in any moving body which is operated by a driver. The eye part detection apparatus may be installed in a flight vehicle such as an airplane or a helicopter. The eye part detection apparatus may also be installed in a ship. Imaging units other than the exemplified camera may be used, and a configuration of the data processing section is not also limited to the configuration illustrated in FIG. 2.

According to an aspect of this disclosure, there is provided an eye part detection apparatus including a unit configured to input an image of a face captured at each specific time; a unit configured to extract an eye search region on the basis of feature points including a nose from the image; a unit configured to correlate the eye search region at a first time with the eye search region at a second time on the basis of comparison between positions of the feature points at the first time and positions of the feature points at the second time; and a unit configured to determine eye part regions from the eye search regions at the first and second times on the basis of the correlated eye search regions at the first and second times.

The unit configured to correlate eye search regions may determine a positional deviation amount between the eye search regions at the first and second times on the basis of the correlation between the eye search region at the first time and the eye search region at the second time.

The unit configured to correlate eye search regions may perform template matching with the eye search region at the second time by using the eye search region at the first time as a template.

The unit configured to extract an eye search region may correct luminance of the eye search region at the first time or the second time on the basis of a difference in luminance of at least one pixel in the eye search regions at the first and second times.

The unit configured to determine an eye part region may include difference image creation unit configured to calculate a luminance difference value for respective correlated pixels of the eye search region at the first time and the eye search region at the second time.

The unit configured to determine an eye part region may determine a pair of regions whose relative positions satisfy a predetermined condition as the eye part regions in the correlated eye search regions.

The unit configured to determine an eye part region may further include ternarization processing unit configured to ternarize the difference value.

The unit configured to determine an eye part region may determine whether or not eye part regions are detected on the basis of a total number of regions in which a difference occurs in the eye search region.

The unit configured to determine an eye part region may determine whether or not eye part regions are detected on the basis of a total area of regions in which a difference occurs in the eye search region.

According to the aspect of this disclosure, the eye search region is set on the basis of feature points including a nose, and the eye search region at the first time is correlated with the eye search region at the second time on the basis of comparison between positions of the feature points at the first time and positions of the feature points at the second time. The eye part regions are determined from the eye search regions at the first and second times on the basis of the correlated eye search regions at the first and second times. Even in a case where a direction of the face changes, a shape change of the nose is relatively small. Since the nose is located around the center of the face, even in a case where the face rotates, the variation in the relative position between the nose and the eye parts is small.

The eye search region is set with the nose as a reference, and thus an eye part position can be accurately detected even in a case where the shape of the face changes.

Since a positional deviation amount between the eye search regions at the first and second times is determined on the basis of the correlation between the eye search region at the first time and the eye search region at the second time, it is possible to accurately extract eye part regions.

According to the aspect of this disclosure, template matching with the eye search region at the second time is performed by using the eye search region at the first time as a template, and thus it is possible to accurately perform positional deviation correction.

According to the aspect of this disclosure, since the unit configured to extract an eye search region corrects the luminance of the eye search region at the first time or the second time on the basis of a difference in the luminance of at least one pixel in the eye search regions at the first and second times, it is possible to perform a process of correcting a luminance difference between frames at a high speed.

According to the aspect of this disclosure, since the average luminance of the eye search region is calculated and the luminance of the eye search region is corrected on the basis of the average luminance, it is possible to suitably determine eye part regions even in a case where ambient illumination varies at the first time and the second time.

According to the aspect of this disclosure, a pair of regions whose relative positions satisfy a predetermined condition is determined as the eye part regions in the correlated eye search regions. Since the human eyes fall within a predetermined range in the horizontal direction, and heights thereof in the vertical direction are substantially the same as each other, it is possible to accurately detect eye part regions by comparing relative positions in the horizontal direction and the vertical direction.

According to the aspect of this disclosure, there is provided a ternarization processing unit configured to calculate a luminance difference value for respective correlated pixels of the eye search region at the first time and the eye search region at the second time, and ternarizing the difference value. Since a difference value for the respective correlated pixels is ternarized, it is possible to accurately identify a region in which a luminance variation is small, a region which changes from a bright state to a dark state, and a region which changes from a dark state to a bright state, in the eye search region. Therefore, it is possible to accurately detect a case where the eyelids are closed and a case where the eyelids are open.

According to the aspect of this disclosure, it is determined whether or not eye part regions are detected on the basis of a total number of regions in which a difference occurs in the eye search region. In addition, it is determined whether or not eye part regions are detected on the basis of a total area of regions in which a difference occurs in the eye search region. Consequently, even in a case where a driver wears glasses or the like, an image in which noise is considerable can be excluded, and thus eye part regions can be accurately determined.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An eye part detection apparatus comprising:
an imaging section configured to input an image of a face captured for each specific time; and
a data processing section including a memory and a calculation unit including
a unit configured to extract an eye search region on the basis of feature points including a nose from the image;
a unit configured to correlate the eye search region at a first time with the eye search region at a second time on the basis of comparison between positions of the feature points at the first time and positions of the feature points at the second time; and
a unit configured to determine eye part regions from the eye search regions at the first and second times on the basis of the correlated eye search regions at the first and second times;
wherein the unit configured to determine eye part regions includes a difference image creation unit configured to calculate a luminance difference value for respective correlated pixels of the eye search region at the first time and the eye search region at the second time.

2. The eye part detection apparatus according to claim 1, wherein the unit configured to correlate eye search regions determines a positional deviation amount between the eye search regions at the first and second times on the basis of the correlation between the eye search region at the first time and the eye search region at the second time.

3. The eye part detection apparatus according to claim 1, wherein the unit configured to correlate eye search regions performs template matching with the eye search region at the second time by using the eye search region at the first time as a template.

4. The eye part detection apparatus according to claim 1, wherein the unit configured to extract an eye search region corrects luminance of the eye search region at the first time or the second time on the basis of a difference in luminance of at least one pixel in the eye search regions at the first and second times.

5. The eye part detection apparatus according to claim 1, wherein the unit configured to determine an eye part region determines a pair of regions whose relative positions satisfy a predetermined condition as the eye part regions in the correlated eye search regions.

6. The eye part detection apparatus according to claim 1, wherein the difference image creation unit calculates average luminance of the eye search region and corrects luminance of the eye search region on the basis of the average luminance.

7. The eye part detection apparatus according to claim 1, wherein the unit configured to determine an eye part region further includes a ternarization processing unit configured to ternarize the difference value.

8. The eye part detection apparatus according to claim 1, wherein the unit configured to determine an eye part region determines whether or not eye part regions are detected on the basis of a total number of regions in which a difference occurs in the eye search region.

9. The eye part detection apparatus according claim 1, wherein the unit configured to determine an eye part region determines whether or not eye part regions are detected on the basis of a total area of regions in which a difference occurs in the eye search region.

* * * * *